United States Patent
Schofield et al.

(10) Patent No.: US 7,873,187 B2
(45) Date of Patent: *Jan. 18, 2011

(54) DRIVER ASSISTANCE SYSTEM FOR VEHICLE

(75) Inventors: Kenneth Schofield, Holland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/856,737

(22) Filed: Aug. 16, 2010

(65) Prior Publication Data

US 2010/0312446 A1    Dec. 9, 2010

Related U.S. Application Data

(63) Continuation of application No. 12/606,476, filed on Oct. 27, 2009, now Pat. No. 7,792,329, which is a continuation of application No. 12/429,605, filed on Apr. 24, 2009, now Pat. No. 7,616,781, which is a continuation of application No. 11/105,757, filed on Apr. 14, 2005, now Pat. No. 7,526,103.

(60) Provisional application No. 60/644,903, filed on Jan. 19, 2005, provisional application No. 60/642,227, filed on Jan. 7, 2005, provisional application No. 60/607,963, filed on Sep. 8, 2004, provisional application No. 60/562,480, filed on Apr. 15, 2004.

(51) Int. Cl.
*G06K 9/00* (2006.01)
*G05D 1/06* (2006.01)

(52) U.S. Cl. .......................... 382/104; 382/172; 701/8

(58) Field of Classification Search .................. 382/100, 382/103, 104, 106, 107, 113, 122, 123, 154, 382/156, 162, 170, 178, 172, 181, 190, 194, 382/199, 232–254, 285–295, 305, 319, 203; 340/435, 815.4; 701/1, 8, 38, 93; 348/168
See application file for complete search history.

(56) References Cited

U.S. PATENT DOCUMENTS 2,632,040 A    3/1953    Rabinow (Continued)

FOREIGN PATENT DOCUMENTS

EP    0426503    5/1991

(Continued)

OTHER PUBLICATIONS

Article entitled "Generation of Vision Technology," published by VLSI Vision Limited, publication date unknown.

(Continued)

*Primary Examiner*—Seyed Azarian
(74) *Attorney, Agent, or Firm*—Vandyke, Gardner, Linn & Burkhart, LLP

(57) ABSTRACT

A driver assistance system for a vehicle includes an imaging device having a field of view forward of a vehicle and in a direction of travel of the equipped vehicle, an image processor operable to process image data captured by the imaging device, and a global positioning system operable to determine a geographical location of the vehicle. The equipped vehicle includes an adaptive speed control system for controlling the speed of the equipped vehicle. The adaptive speed control system may reduce the speed of the equipped vehicle responsive at least in part to a detection of a curve in the road ahead of the equipped vehicle via processing by the image processor of image data captured by the imaging device.

32 Claims, 4 Drawing Sheets

U.S. PATENT DOCUMENTS

| | | |
|---|---|---|
| 2,827,594 A | 3/1958 | Rabinow |
| 3,141,393 A | 7/1964 | Platt |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie ................ 350/302 |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama ................ 350/458 |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. ........... 318/444 |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. ......... 318/483 |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,647,161 A | 3/1987 | Müller ................ 350/462 |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,727,290 A | 2/1988 | Smith et al. |
| 4,731,669 A | 3/1988 | Hayashi et al. |
| 4,741,603 A | 5/1988 | Miyagi |
| 4,768,135 A | 8/1988 | Kretschmer |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. ............ 430/321 |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. ............ 350/162.17 |
| 5,027,001 A | 6/1991 | Torbert ................ 307/10.1 |
| 5,027,200 A | 6/1991 | Petrossian et al. |
| 5,044,706 A | 9/1991 | Chen ................ 359/357 |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,029 A | 3/1993 | Schofield |
| 5,204,778 A | 4/1993 | Bechtel |
| 5,208,701 A | 5/1993 | Maeda ................ 359/574 |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |

| | | | | | |
|---|---|---|---|---|---|
| 5,331,312 A | 7/1994 | Kudoh | 5,837,994 A | 11/1998 | Stam et al. |
| 5,336,980 A | 8/1994 | Levers | 5,844,505 A | 12/1998 | Van Ryzin |
| 5,341,437 A | 8/1994 | Nakayama | 5,844,682 A | 12/1998 | Kiyomoto et al. |
| 5,351,044 A | 9/1994 | Mathur et al. | 5,845,000 A | 12/1998 | Breed et al. |
| 5,355,118 A | 10/1994 | Fukuhara | 5,848,802 A | 12/1998 | Breed et al. |
| 5,374,852 A | 12/1994 | Parkes | 5,850,176 A | 12/1998 | Kinoshita et al. ........... 340/435 |
| 5,386,285 A | 1/1995 | Asayama | 5,867,591 A | 2/1999 | Onda ......................... 382/154 |
| 5,394,333 A | 2/1995 | Kao | 5,877,707 A | 3/1999 | Kowalick |
| 5,406,395 A | 4/1995 | Wilson et al. .................. 359/15 | 5,877,897 A | 3/1999 | Schofield et al. |
| 5,410,346 A | 4/1995 | Saneyoshi et al. | 5,878,370 A | 3/1999 | Olson |
| 5,414,257 A | 5/1995 | Stanton | 5,883,739 A | 3/1999 | Ashihara et al. ............ 359/462 |
| 5,414,461 A | 5/1995 | Kishi et al. .................. 348/115 | 5,884,212 A | 3/1999 | Lion |
| 5,416,313 A | 5/1995 | Larson et al. | 5,890,021 A | 3/1999 | Onoda ........................ 396/121 |
| 5,416,318 A | 5/1995 | Hegyi | 5,896,085 A | 4/1999 | Mori et al. .................. 340/469 |
| 5,416,478 A | 5/1995 | Morinaga | 5,899,956 A | 5/1999 | Chan |
| 5,424,952 A | 6/1995 | Asayama | 5,914,815 A | 6/1999 | Bos |
| 5,426,294 A | 6/1995 | Kobayashi et al. | 5,923,027 A | 7/1999 | Stam et al. |
| 5,430,431 A | 7/1995 | Nelson | 5,929,786 A | 7/1999 | Schofield et al. |
| 5,440,428 A | 8/1995 | Hegg et al. | 5,940,120 A | 8/1999 | Frankhouse et al. |
| 5,444,478 A | 8/1995 | Lelong et al. | 5,949,331 A | 9/1999 | Schofield et al. ............ 340/461 |
| 5,451,822 A | 9/1995 | Bechtel et al. | 5,956,181 A | 9/1999 | Lin |
| 5,461,357 A | 10/1995 | Yoshioka et al. | 5,959,367 A | 9/1999 | O'Farrell et al. |
| 5,461,361 A | 10/1995 | Moore | 5,959,555 A | 9/1999 | Furuta |
| 5,469,298 A | 11/1995 | Suman et al. | 5,963,247 A | 10/1999 | Banitt |
| 5,471,515 A | 11/1995 | Fossum et al. | 5,971,552 A | 10/1999 | O'Farrell et al. |
| 5,475,494 A | 12/1995 | Nishida et al. | 5,986,796 A | 11/1999 | Miles |
| 5,498,866 A | 3/1996 | Bendicks et al. | 5,990,469 A | 11/1999 | Bechtel et al. |
| 5,500,766 A | 3/1996 | Stonecypher | 5,990,649 A | 11/1999 | Nagao et al. |
| 5,510,983 A | 4/1996 | Iino | 6,020,704 A | 2/2000 | Buschur |
| 5,515,448 A | 5/1996 | Nishitani | 6,049,171 A | 4/2000 | Stam et al. |
| 5,521,633 A | 5/1996 | Nakajima et al. | 6,066,933 A | 5/2000 | Ponziana |
| 5,528,698 A | 6/1996 | Kamei et al. | 6,084,519 A | 7/2000 | Coulling et al. |
| 5,529,138 A | 6/1996 | Shaw et al. | 6,087,953 A | 7/2000 | DeLine et al. |
| 5,530,240 A | 6/1996 | Larson et al. | 6,097,023 A | 8/2000 | Schofield et al. |
| 5,530,420 A | 6/1996 | Tsuchiya et al. ............ 340/435 | 6,097,024 A | 8/2000 | Stam et al. |
| 5,535,314 A | 7/1996 | Alves et al. | 6,116,743 A | 9/2000 | Hoek |
| 5,537,003 A | 7/1996 | Bechtel et al. | 6,124,647 A | 9/2000 | Marcus et al. |
| 5,539,397 A | 7/1996 | Asanuma et al. | 6,124,886 A | 9/2000 | DeLine et al. ............... 348/148 |
| 5,541,590 A | 7/1996 | Nishio | 6,139,172 A | 10/2000 | Bos et al. |
| 5,550,677 A | 8/1996 | Schofield et al. | 6,144,022 A | 11/2000 | Tenenbaum et al. |
| 5,568,027 A | 10/1996 | Teder | 6,172,613 B1 | 1/2001 | DeLine et al. |
| 5,574,443 A | 11/1996 | Hsieh | 6,175,164 B1 | 1/2001 | O'Farrell et al. |
| 5,581,464 A | 12/1996 | Woll et al. | 6,175,300 B1 | 1/2001 | Kendrick |
| 5,594,222 A | 1/1997 | Caldwell | 6,198,409 B1 | 3/2001 | Schofield et al. |
| 5,614,788 A | 3/1997 | Mullins | 6,201,642 B1 | 3/2001 | Bos |
| 5,619,370 A | 4/1997 | Guinosso | 6,222,447 B1 | 4/2001 | Schofield et al. ............ 340/461 |
| 5,634,709 A | 6/1997 | Iwama | 6,222,460 B1 | 4/2001 | DeLine et al. |
| 5,642,299 A | 6/1997 | Hardin et al. | 6,243,003 B1 | 6/2001 | DeLine et al. |
| 5,648,835 A | 7/1997 | Uzawa ....................... 396/429 | 6,259,412 B1 | 7/2001 | Duroux |
| 5,650,944 A | 7/1997 | Kise | 6,266,442 B1 * | 7/2001 | Laumeyer et al. ........... 382/190 |
| 5,660,454 A | 8/1997 | Mori et al. | 6,285,393 B1 | 9/2001 | Shimoura et al. |
| 5,661,303 A | 8/1997 | Teder | 6,291,906 B1 | 9/2001 | Marcus et al. |
| 5,670,935 A | 9/1997 | Schofield et al. | 6,294,989 B1 | 9/2001 | Schofield et al. |
| 5,677,851 A | 10/1997 | Kingdon et al. | 6,297,781 B1 | 10/2001 | Turnbull et al. |
| 5,699,044 A | 12/1997 | Van Lente et al. | 6,302,545 B1 | 10/2001 | Schofield et al. |
| 5,724,187 A | 3/1998 | Varaprasad et al. | 6,313,454 B1 | 11/2001 | Bos et al. |
| 5,724,316 A | 3/1998 | Brunts | 6,317,057 B1 | 11/2001 | Lee |
| 5,737,226 A | 4/1998 | Olson et al. | 6,320,176 B1 | 11/2001 | Schofield et al. |
| 5,760,826 A | 6/1998 | Nayar ......................... 348/36 | 6,326,613 B1 | 12/2001 | Heslin et al. |
| 5,760,828 A | 6/1998 | Cortes ........................ 348/143 | 6,329,925 B1 | 12/2001 | Skiver et al. |
| 5,760,931 A | 6/1998 | Saburi et al. | 6,333,759 B1 | 12/2001 | Mazzilli |
| 5,760,962 A | 6/1998 | Schofield et al. | 6,353,392 B1 | 3/2002 | Schofield et al. |
| 5,761,094 A | 6/1998 | Olson et al. | 6,366,213 B2 * | 4/2002 | DeLine et al. ........... 340/815.4 |
| 5,765,116 A | 6/1998 | Wilson-Jones et al. | 6,370,329 B1 | 4/2002 | Teuchert |
| 5,781,437 A | 7/1998 | Wiemer et al. | 6,396,397 B1 | 5/2002 | Bos et al. |
| 5,786,772 A | 7/1998 | Schofield et al. | 6,411,204 B1 | 6/2002 | Bloomfield et al. |
| 5,790,403 A | 8/1998 | Nakayama | 6,420,975 B1 * | 7/2002 | DeLine et al. ........... 340/815.4 |
| 5,790,973 A | 8/1998 | Blaker et al. | 6,424,273 B1 | 7/2002 | Gutta et al. .................. 340/937 |
| 5,793,308 A | 8/1998 | Rosinski et al. | 6,428,172 B1 | 8/2002 | Hutzel et al. |
| 5,793,420 A | 8/1998 | Schmidt | 6,433,676 B2 | 8/2002 | DeLine et al. |
| 5,796,094 A | 8/1998 | Schofield et al. | 6,442,465 B2 | 8/2002 | Breed et al. |
| 5,798,575 A | 8/1998 | O'Farrell et al. | 6,477,464 B2 | 11/2002 | McCarthy et al. |
| 5,835,255 A | 11/1998 | Miles | 6,485,155 B1 | 11/2002 | Duroux et al. |

| | | |
|---|---|---|
| 6,498,620 B2 | 12/2002 | Schofield et al. |
| 6,513,252 B1 | 2/2003 | Schierbeek et al. |
| 6,523,964 B2 | 2/2003 | Schofield et al. |
| 6,534,884 B2 | 3/2003 | Marcus et al. ............. 307/10.1 |
| 6,539,306 B2 | 3/2003 | Turnbull |
| 6,547,133 B1 | 4/2003 | DeVries, Jr. et al. |
| 6,553,130 B1 | 4/2003 | Lemelson et al. ........... 382/104 |
| 6,559,435 B2 | 5/2003 | Schofield et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,636,258 B2 | 10/2003 | Strumolo ................... 348/149 |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. ............. 359/877 |
| 6,674,562 B1 | 1/2004 | Miles |
| 6,680,792 B2 | 1/2004 | Miles |
| 6,690,268 B2 | 2/2004 | Schofield et al. |
| 6,704,621 B1 | 3/2004 | Stein et al. |
| 6,710,908 B2 | 3/2004 | Miles et al. |
| 6,711,474 B1 * | 3/2004 | Treyz et al. .................... 701/1 |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,953,253 B2 | 10/2005 | Schofield et al. |
| 7,085,637 B2 * | 8/2006 | Breed et al. .................... 701/38 |
| 7,092,548 B2 * | 8/2006 | Laumeyer et al. ........... 382/104 |
| 7,202,776 B2 * | 4/2007 | Breed ......................... 340/435 |
| 7,227,459 B2 | 6/2007 | Bos et al. |
| 7,337,055 B2 * | 2/2008 | Matsumoto et al. .......... 701/93 |
| 7,526,103 B2 | 4/2009 | Schofield et al. |
| 7,616,781 B2 | 11/2009 | Schofield et al. |
| 2002/0015153 A1 | 2/2002 | Downs |
| 2002/0044065 A1 | 4/2002 | Quist et al. |
| 2002/0159270 A1 | 10/2002 | Lynam et al. |
| 2003/0227777 A1 | 12/2003 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0200948 A1 | 10/2004 | Bos et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0091813 A1 | 5/2006 | Stam et al. |
| 2007/0023613 A1 | 2/2007 | Schofield et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2010/0045797 A1 | 2/2010 | Schofield et al. |

FOREIGN PATENT DOCUMENTS

| | | |
|---|---|---|
| EP | 0492591 | 7/1992 |
| EP | 0788947 | 8/1997 |
| EP | 0830267 B1 | 12/2001 |
| FR | 2 641 237 A1 | 7/1990 |
| JP | 59114139 | 7/1984 |
| JP | 6080953 | 5/1985 |
| JP | 62-131837 | 6/1987 |
| JP | 6414700 | 1/1989 |
| JP | 0550883 | 3/1993 |
| JP | 0577657 | 3/1993 |
| JP | 6227318 | 8/1994 |
| JP | 06-267304 | 9/1994 |
| JP | 06276524 A | 9/1994 |
| JP | 06-295601 | 10/1994 |
| JP | 074170 | 1/1995 |
| JP | 7-32936 | 2/1995 |
| JP | 7-47878 | 2/1995 |
| JP | 7-052706 | 2/1995 |
| JP | 7-69125 | 3/1995 |
| JP | 07105496 | 4/1995 |
| JP | 2630604 | 4/1997 |
| WO | WO 86/05147 | 9/1986 |
| WO | WO-9419212 A | 9/1994 |
| WO | 9814974 | 4/1998 |
| WO | 9914088 | 3/1999 |
| WO | 9923828 | 5/1999 |

OTHER PUBLICATIONS

Article entitled "On-Chip CMOS Sensors for VLSI Imaging Systems," published by VLSI Vision Limited, 1991.

Hamit, Francis "360-Degree Interactivity: New Video and Still Cameras Provide a Global Roaming Viewpoint", *Advanced Imaging*, Mar. 1997, p. 50.

Johannes, Laura "A New Microchip Ushers in Cheaper Digital Cameras", *The Wall Street Journal*, Aug. 21, 1998, p. B1.

Decision—Motions—Bd. R. 125(a), issued Aug. 29, 2006 in connection with Interference No. 105,325, which involved U.S. Appl. No. 09/441,341, filed Nov. 16, 1999 by Schofield et al. and U.S. Patent No. 5,837,994, issued to Stam et al.

Wang, G., et al. "CMOS Video Cameras", IEEE, 1991, p. 100-103.

Ballard, Dana H. et al., "Computer Vision", 1982, p. 88-89, sect. 3.4.1.

* cited by examiner

DRIVER ASSISTANCE SYSTEM FOR VEHICLE

CROSS REFERENCE TO RELATED APPLICATIONS

The present application is a continuation of U.S. patent application Ser. No. 12/606,476, filed Oct. 27, 2009, now U.S. Pat. No. 7,792,329, which is a continuation of U.S. patent application Ser. No. 12/429,605, filed Apr. 24, 2009, now U.S. Pat. No. 7,616,781, which is a continuation of U.S. patent application Ser. No. 11/105,757, filed Apr. 14, 2005, now U.S. Pat. No. 7,526,103, which claims benefit of U.S. provisional applications, Ser. No. 60/644,903, filed Jan. 19, 2005 by Byers et al. for MIRROR ASSEMBLY WITH HEATER ELEMENT; Ser. No. 60/642,227, filed Jan. 7, 2005 by Karner et al. for MOUNTING ASSEMBLY FOR MIRROR AND METHOD OF MAKING SAME; Ser. No. 60/607,963, filed Sep. 8, 2004 by Schofield for IMAGING SYSTEM FOR VEHICLE; and Ser. No. 60/562,480, filed Apr. 15, 2004 by Schofield for IMAGING SYSTEM FOR VEHICLE, which are hereby incorporated herein by reference in their entireties.

FIELD OF THE INVENTION

The present invention relates generally to an imaging system for a vehicle and, more particularly, to an imaging system that may display information to a driver of the vehicle and/or control an accessory in response to images captured by a camera or image capture device.

BACKGROUND OF THE INVENTION

It is known to provide an image capture device at a vehicle for capturing images of the scene occurring exteriorly of the vehicle, such as forwardly or rearwardly or sidewardly of the vehicle. The captured images may be processed by a processing system and the system may control the headlamps of the vehicle or may provide an image display to the driver of the vehicle or may provide other information or signals, depending on the particular application of the imaging system.

SUMMARY OF THE INVENTION

The present invention provides an imaging system for a vehicle that is operable to identify and read traffic control signage as the vehicle travels along a road. The system may provide an information display and/or alert to a driver of the vehicle in response to the images captured by a camera or imaging device of the vehicle. The imaging system of the present invention may also process captured images and control one or more accessories in response to such processing. For example, the imaging system of the present invention may control the headlamps or may adjust or control the direction of the headlamps in response to such image processing.

According to an aspect of the present invention, an imaging system for a vehicle includes an imaging device, a display device and an image processor. The imaging device has a field of view exteriorly and forwardly of the vehicle in its direction of travel and captures images representative of the exterior scene. The image processor processes the captured images and determines whether the captured image encompasses an image of a traffic control sign. If the image processor determines that the captured image encompasses a traffic control sign of interest, the image processor determines the numerals, characters or other information on the face of the sign. The image processor may control the display device in response to the determined characters or information and in response to a vehicle speed input that is indicative of the speed that the vehicle is traveling. The display device thus may display information to a driver of the vehicle in response to an output of the image processor and/or may generate at least one of a visible, audible or tactile/haptic signal to alert the driver that he or she has entered a different speed zone. Most preferably, the display information and/or alert differentiates and distinguishes from and is characteristic of an allowed increase in driving speed from one zone to another and a decrease in driving speed from one zone to another, whereby the driver is informed as to whether it is allowable to drive faster or is required to drive slower.

Preferably, the imaging device and the associated image processor are located within the interior cabin of the vehicle with a field of view through the vehicle windshield and, most preferably, the image processor is located at an interior rearview mirror assembly or at a windshield electronic module located at a central upper windshield location. Preferably, the imaging system can be multi-tasking, and thus may be part of or associated with other vehicle accessories or systems or may access or share components or circuitry of other vehicle accessories or systems. For example, the image processor may preferably derive further information from the processed captured images, such as a determination of location, intensity and type of oncoming headlamps or leading taillights being approached by the vehicle, rain or fog or the like present and detected within the forward field of view, a presence of obstacles or objects or vehicles in the forward field of view and/or the like, such as in connection with a headlamp control system, a precipitation sensor, an adaptive cruise control system, a lane departure warning system, a traffic lane control system and/or the like.

For example, the image processor may determine that a speed limit sign is within the captured image by analyzing the size, shape and location of a detected object. The image processor may then determine or recognize the characters or numbers or information on the face of the speed limit sign to determine the speed limit in the area through which the vehicle is traveling. The display device may display information to the driver of the vehicle in response to the determined characters and the vehicle speed. For example, if the vehicle speed is substantially greater than the posted and determined speed limit, the display device may display information to that effect or may provide a warning or alert signal to alert the driver of the excessive speed that the vehicle is traveling.

According to another aspect of the present invention, an imaging system for a vehicle includes an imaging device and an image processor. The imaging device has a field of view exteriorly and forward of the vehicle in its direction of travel. The imaging device is operable to capture images representative of the exterior scene. The image processor is operable to process the captured images in accordance with an algorithm. The algorithm comprises a sign recognition routine and a character recognition routine.

The algorithm may pass to the character recognition routine after the sign recognition routine. The image processor may process the captured image to determine whether the captured image encompasses an image of a traffic control sign of interest when in the sign recognition routine. The image processor may process the captured image to determine what the characters on the face of the sign represent when in the character recognition routine. The algorithm may proceed to the character recognition routine in response to the image processor determining that the captured image encompasses an image of a traffic control sign of interest.

The imaging system may include at least one of a visible alert, an audible alert and a tactile alert to a driver of the vehicle in response to an output of the image processor. The visible alert may display information indicative of at least one of the vehicle speed, a posted speed limit and a difference between the vehicle speed and the posted speed limit.

The imaging system may be also or otherwise operable to control a headlamp setting or headlamp beam direction of the vehicle in response to detected headlamps or taillights or other objects of interest along the path of travel of the vehicle. The imaging system may detect objects of interest, such as objects that may pose a threat to the vehicle or lane markers or other objects, and may display information regarding the objects or other information to the driver of the vehicle, such as at a video display screen or laser display or heads up display or the like.

Therefore, the present invention provides an imaging system that is operable to detect and recognize and read traffic control signage along the side (and/or above) the road along which the vehicle is traveling. The imaging system may then display information to the driver of the vehicle regarding the detected and recognized signage. The imaging system may provide a warning or alert signal to the driver if an unsafe or unwanted driving condition is encountered, such as when the vehicle is traveling at a speed that is substantially over the speed limit or is approaching a turn at too high a speed or the like.

These and other objects, advantages, purposes and features of the present invention will become apparent upon review of the following specification in conjunction with the drawings.

DESCRIPTION OF THE PREFERRED EMBODIMENTS

Figure 1:
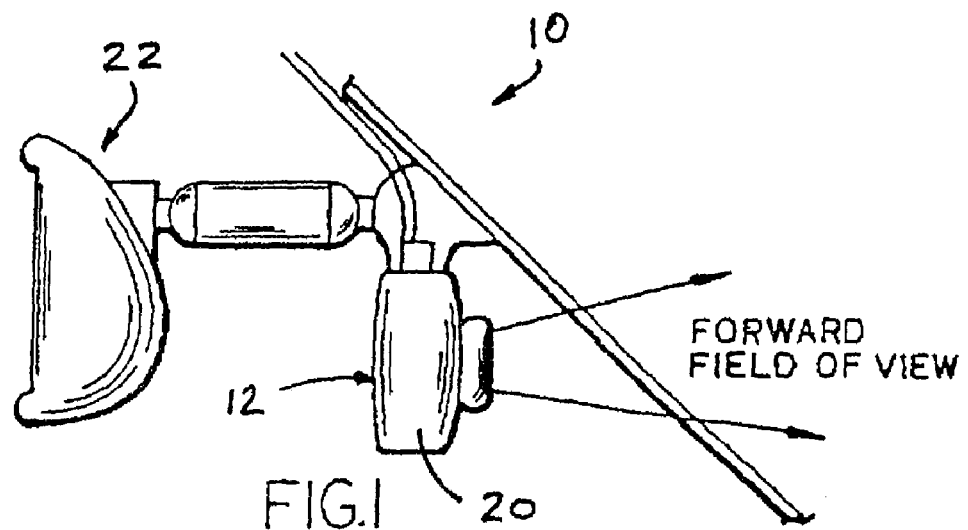
FIG. 1 is a side elevation of a portion of a vehicle embodying an imaging system in accordance with the present invention.
Figure 2:
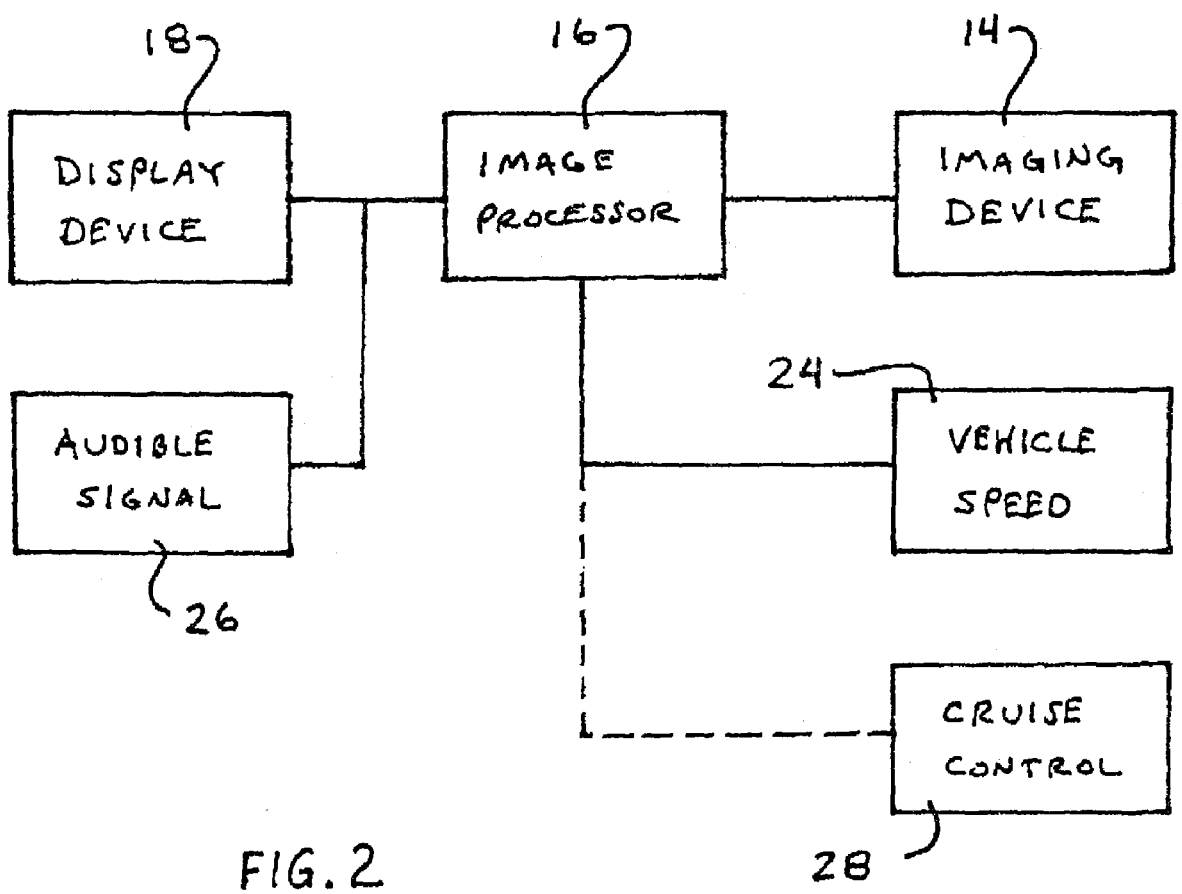
FIG. 2 is a block diagram of an imaging system in accordance with the present invention.

Referring now to the drawings and the illustrative embodiments depicted therein, a vehicle 10 includes an imaging system 12, which includes an imaging sensor or image capture device or camera 14, which captures images of a scene occurring exteriorly of the vehicle 10 (FIGS. 1 and 2). Imaging system 12 includes a control including an image processor 16, which receives data from imaging device 14. The image processor 16 processes the captured images or captured image data and may identify traffic control signage (such as stop signs, speed limit signs, exit signs and the like) and may identify the characters, numbers and/or information that is printed or formed or established on the faces of the signs and may generate an output signal in response to the identified characters/numbers/information. The imaging system 12 includes a display or display device 18, which may be positioned within the vehicle (such as at an interior rearview mirror assembly of the vehicle or at an accessory module (such as located at an upper portion of the windshield) of the vehicle or at an instrument panel of the vehicle or at an overhead console of the vehicle or the like) and which displays information in response to image processor 16 processing the captured images, as discussed below.

The imaging device 14 may comprise an imaging array sensor, such as a CMOS sensor or a CCD sensor or the like, such as described in U.S. Pat. Nos. 5,550,677; 5,670,935; 5,796,094; 6,498,620; 5,877,897; 6,396,397; and 6,313,454, and U.S. patent application Ser. No. 10/421,281, filed Apr. 23, 2003 by Schofield for AUTOMATIC HEADLAMP CONTROL, now U.S. Pat. No. 7,004,606, which are hereby incorporated herein by reference. In a preferred embodiment, the imaging system 12 may include a lens element or optic between the imaging device 14 and the exterior scene. The optic may comprise an asymmetric optic, which focuses a generally central portion of the scene onto the imaging device, while providing classical distortion on the periphery of the scene or field of view.

In the illustrated embodiment, the imaging device 14 is mounted at or in an accessory module or pod 20 and is arranged to have a field of view forward of the vehicle. The imaging device 14 thus may capture images of a forward scene as the vehicle is traveling forwardly along a road or street or highway or the like. Optionally, the imaging device may be positioned elsewhere, such as at or in the interior rearview mirror assembly 22, or at or in an accessory module or windshield electronics module or the like (as discussed below), without affecting the scope of the present invention.

Display 18 of imaging system 12 may be positioned in the vehicle and may be readily viewable by the driver of the vehicle. For example, display 18 may be positioned in the interior rearview mirror assembly 22 and may be viewable at the reflective element of the mirror assembly or at or around the reflective element or bezel portion, such as at the chin or eyebrow region of the mirror assembly. Optionally, the display device 18 may be at or in or associated with an accessory module or windshield electronics module or the like at or near the interior rearview mirror assembly, such as an accessory module or windshield electronics module of the types described in U.S. patent applications Ser. No. 10/355,454, filed Jan. 31, 2003 by Schofield et al. for VEHICLE ACCESSORY MODULE, now U.S. Pat. No. 6,824,281; and Ser. No. 10/456,599, filed Jun. 6, 2003 by Weller et al. for INTERIOR REARVIEW MIRROR SYSTEM WITH COMPASS, now U.S. Pat. No. 7,004,593, and/or U.S. Pat. Nos. 6,690,268; 6,250,148; 6,341,523; 6,593,565; and 6,326,613, and/or in PCT Application No. PCT/US03/40611, filed Dec. 19, 2003 by Donnelly Corp. et al. for ACCESSORY SYSTEM FOR VEHICLE, which are hereby incorporated herein by reference. Optionally, the display device may be at or in an overhead console (such as a console of the types described in PCT Application No. PCT/US03/40611, filed Dec. 19, 2003 by Donnelly Corp. et al. for ACCESSORY SYSTEM FOR VEHICLE, which is hereby incorporated herein by reference) or elsewhere in the vehicle, such as in the instrument panel of the vehicle or the like, without affecting the scope of the present invention.

Display or display device 18 may comprise any type of display element or device or screen, without affecting the scope of the present invention. For example, display device 18 may comprise a backlit display, which may be laser-etched or otherwise formed on or placed on (such as via an appliqué or the like) the surface of the reflective element of the mirror assembly (such as via removing the reflective coating of the reflective element to form a desired port or icon or character and/or such as by utilizing aspects described in U.S. Pat. No. 4,882,565, issued to Gallmeyer, which is hereby incorporated herein by reference) to allow light from corresponding illumination sources or elements to pass through the reflective element to illuminate the appropriate port or icon or character for viewing by the driver or occupant of the vehicle, such as described in U.S. patent applications Ser. No. 10/456,599, filed Jun. 6, 2003 by Weller et al. for INTERIOR REARVIEW MIRROR SYSTEM WITH COMPASS, now U.S. Pat. No. 7,004,593; and/or Ser. No. 11/029,695, filed Jan. 5, 2005 by Lindahl et al. for MIRROR ASSEMBLY, now U.S. Pat. No. 7,253,723, which are hereby incorporated herein by reference. Optionally, the display device may comprise a video screen (such as the types described in PCT Application No. PCT/US03/40611, filed Dec. 19, 2003 by Donnelly Corp. et al. for ACCESSORY SYSTEM FOR VEHICLE, and/or U.S. provisional application Ser. No. 60/630,061, filed Nov. 22, 2004 by Lynam et al. for MIRROR ASSEMBLY WITH VIDEO DISPLAY, which are hereby incorporated herein by reference), or may comprise a display on demand/transflective type of display or the like at the reflective element of the mirror assembly (where the presence of the display device or element may be substantially masked or not readily viewable unless powered, such as the types described in U.S. Pat. Nos. 6,690,298; 5,668,663 and/or 5,724,187, and/or in U.S. patent applications Ser. No. 10/054,633, filed Jan. 22, 2002, now U.S. Pat. No. 7,195,381; and/or Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference), or may comprise a heads up display that projects the display information for viewing in front of the driver of the vehicle, or may comprise any other type of display (such as the types described in U.S. Pat. Nos. 5,530,240 and/or 6,329,925, which are hereby incorporated herein by reference) or the like, without affecting the scope of the present invention. The display device may include one or more display elements, such as illumination sources, such as vacuum fluorescent (VF) elements, liquid crystal displays (LCDs), light emitting diodes (LEDs), such as inorganic LEDs or organic light emitting diodes (OLEDs), electroluminescent (EL) elements or the like, without affecting the scope of the present invention.

Figure 3:
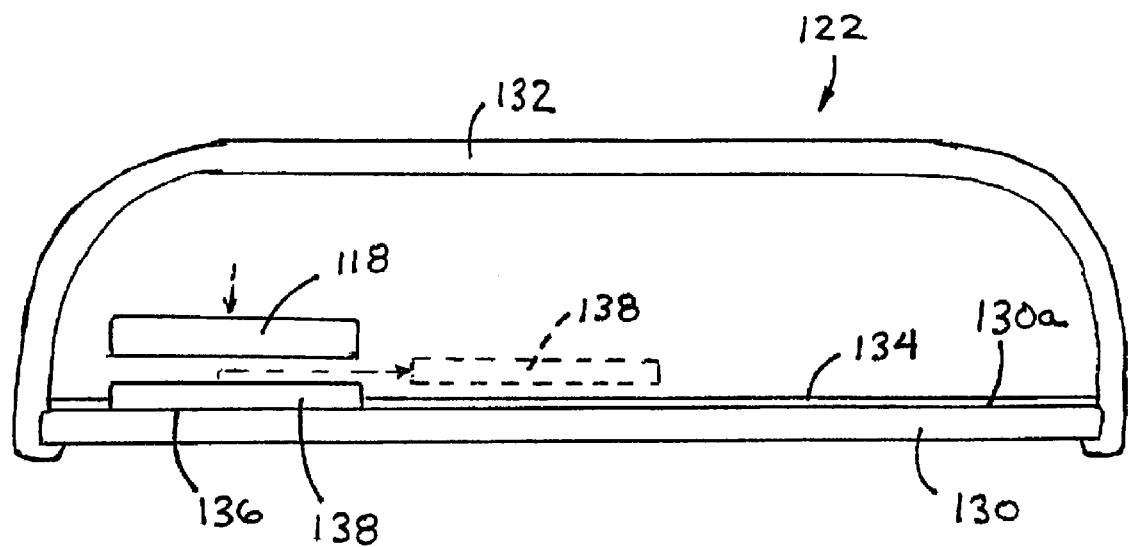
FIG. 3 is a sectional view of an interior rearview mirror assembly having a display device in accordance with the present invention.

Optionally, the display may comprise a video display screen that is selectively viewable, such as at or near the mirror assembly (such as a slide out display of the types described in PCT Application No. PCT/US03/40611, filed Dec. 19, 2003 by Donnelly Corp. et al. for ACCESSORY SYSTEM FOR VEHICLE; and/or U.S. provisional application Ser. No. 60/630,061, filed Nov. 22, 2004 by Lynam et al. for MIRROR ASSEMBLY WITH VIDEO DISPLAY, which are hereby incorporated herein by reference) or through the reflective element of the mirror assembly. For example, and with reference to FIG. 3, a mirror assembly 122 includes a reflective element 130 and a display device or element 118 positioned behind the reflective element 130 and within the mirror housing or casing 132. The reflective element 130 may comprise a fourth surface electro-optic reflective element assembly, such as a fourth surface electrochromic reflective element assembly, and has a reflective coating or paint layer 134 on the rear or fourth surface 130a of the reflective element assembly. Examples of such fourth surface reflective element assemblies are described in U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference. Optionally, the reflective element may comprise a prismatic reflective element with a reflective coating or paint layer on its rear surface. As shown in FIG. 3, the reflective coating 134 is removed or otherwise not present (such as by masking the reflective element surface during the coating process) at a display region 136. The mirror assembly 122 includes a movable reflector 138, such as a small mirror or reflective element or the like, that is selectively positionable at the display region 136 to provide a reflectant element at the display region, so that substantially the entire reflective element 130 reflects to the driver or occupant of the vehicle when the movable reflector 138 is positioned at the display region.

When it is desired to display information to the driver or occupant of the vehicle, movable reflector 138 may be selectively moved, such as by moving the reflector rearward of the rear surface of the reflective element 130 and then to a side of (or above or below) the display region 136. The display element 118 is positioned generally rearward of the display region 136 so that the display element 118 may be viewable through the display window or region when the movable reflector is removed from the display window or region. Optionally, the display element 118 may move toward the display region and may engage or contact the display region of the reflective element 130 to enhance viewing of the display information through the reflective element. When the display information is no longer desired or needed, the display element may move rearward of the reflective element and the movable reflector may move back to the initial position at the display region.

The display element may be operable to display information relating to a rear vision system of the vehicle, a navigation and/or compass system of the vehicle, a telematics system of the vehicle or any other vehicle system. The movable reflector may be selectively moved and the display element may be selectively activated and/or moved in response to a user input (such as a voice command or manual input at a button or switch or sensor or the like), or may be selectively activated and/or moved automatically, such as in response to a triggering event, such as when the vehicle is shifted into reverse for a backup system or when the vehicle approaches a waypoint for a navigational system (such as a navigational system of the types described in PCT Application No. PCT/US03/40611, filed Dec. 19, 2003 by Donnelly Corp. et al. for ACCESSORY SYSTEM FOR VEHICLE; and/or U.S. provisional application Ser. No. 60/611,796, filed Sep. 21, 2004, which are hereby incorporated herein by reference), or other triggering events or the like.

The display element and/or movable reflector may be moved via actuation of an electromagnetic drive motor to move the element/reflector to the appropriate location. Optionally, and particularly for applications where the mirror assembly includes compass circuitry for a compass system of the vehicle, the mirror assembly or system may include a control that may inhibit data sampling by the compass circuitry when the display element and/or movable reflector are moving. For example, the control or system may limit or inhibit data sampling by the compass circuitry when the display is activated or deactivated and/the movable reflector is moving (or when a slide out display is moving (such as a slide out display of the types described in PCT Application No. PCT/US03/40611, filed Dec. 19, 2003 by Donnelly Corp. et al. for ACCESSORY SYSTEM FOR VEHICLE, and/or U.S. provisional application Ser. No. 60/630,061, filed Nov. 22, 2004 by Lynam et al. for MIRROR ASSEMBLY WITH VIDEO DISPLAY, which are hereby incorporated herein by reference). The control or system thus may interact with the compass or compass circuitry or control to reduce or limit or substantially preclude magnetic interference of the compass system during operation of the drive motor (such as an electromagnetic motor) of the movable reflector or slide out display or the like, in order to limit or substantially preclude the capturing of corrupting data that may occur during operation of the electromagnetic motor of the display or movable reflector. The control or system may be operable to limit or inhibit operation of or data collection by the compass circuitry or system during operation of other electromagnetic components of the mirror assembly or accessory module or the like.

Figure 4:
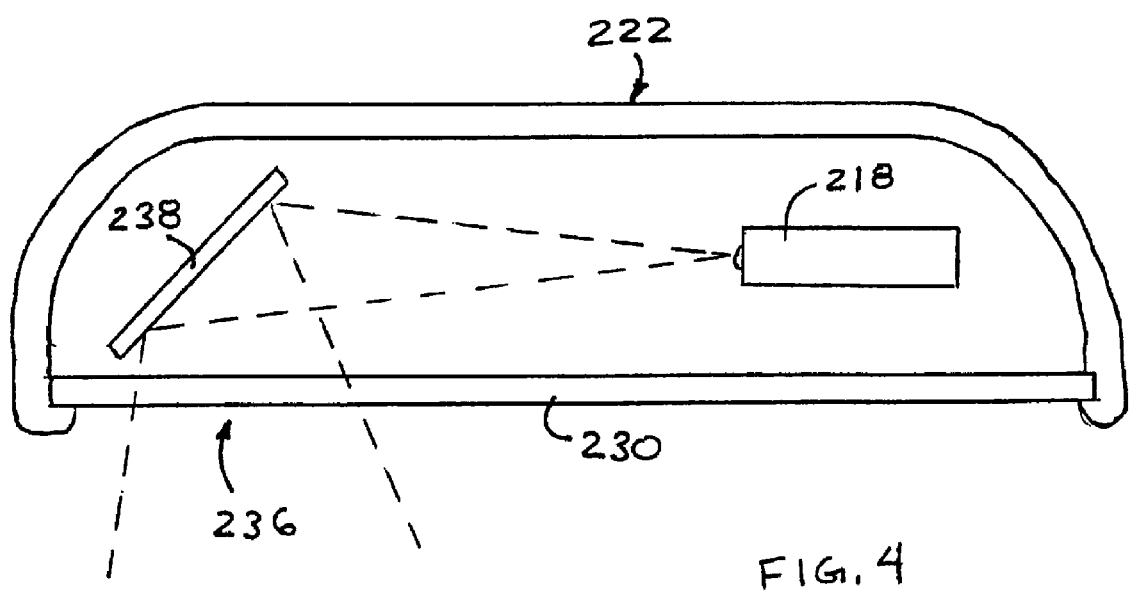
FIG. 4 is a sectional view of another interior rearview mirror assembly having another display device in accordance with the present invention.

Optionally, the display may comprise a steerable laser display positioned within an accessory module or with the interior rearview mirror assembly. For example, and with reference to FIG. 4, an interior rearview mirror assembly 222 includes a steerable laser display device 218, such as a controllable or programmable display device that is operable to project illumination in a controlled or programmed manner. The laser display device 218 may project illumination in a scanning movement, such as at about 30 frames per second, to project an image as the laser scans through multiple rows and/or columns at an image viewing area or display region. In the illustrated embodiment, the scanning display device 218 projects illumination onto an angled reflector 238, which reflects or directs the illumination through a display region 236 of the reflective element 230. The reflective element 230 may comprise a transflective electro-optic reflective element assembly, such that the display information may provide a display on demand display (such as the types disclosed in U.S. Pat. Nos. 6,690,268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; PCT Application No. PCT/US03/29776, filed Sep. 9, 2003 by Donnelly Corp. et al. for MIRROR REFLECTIVE ELEMENT ASSEMBLY; and/or PCT Application No. PCT/US03/40611, filed Dec. 19, 2003 by Donnelly Corp. et al. for ACCESSORY SYSTEM FOR VEHICLE, which are all hereby incorporated herein by reference) that is projectable through the reflective element and viewable by the driver or occupant of the vehicle when the display element is activated, while the reflective element 230 provides sufficient reflectance in the display region when the display element is deactivated.

The laser scanning display element of the present invention thus provides a programmable display that may display text or graphics or indicia or the like. The display element provides information to the driver or occupant of the vehicle as a dynamic display. The display element also provides enhanced brightness over some known or conventional display elements and may be implemented at a lower cost than other known or conventional display elements or devices, such as multi-pixel display screens and the like.

Optionally, a variety of display types or screens can be utilized in conjunction with an interior rearview mirror assembly or windshield electronics module/accessory module of the present invention. For example, any of the liquid crystal type display or video screens (such as the types disclosed in PCT Application No. PCT/US03/40611, filed Dec. 19, 2003 by Donnelly Corp. et al. for ACCESSORY SYSTEM FOR VEHICLE, and/or U.S. provisional application Ser. No. 60/630,061, filed Nov. 22, 2004 by Lynam et al. for MIRROR ASSEMBLY WITH VIDEO DISPLAY, which are hereby incorporated herein by reference) can be utilized. Also, a microdisplay (such as is available from MicroVision Inc. of Bothell, Wash.), in which a single scanner is used to direct multiple light beams simultaneously into separate zones of an image so as to deliver a bright, high resolution, image over a wide field of view, can be used. Such a microdisplay may utilize conventional surface emitting or other types of light emitting diodes (LEDs) as light sources to provide an economical display with sharp resolution and high image brightness. For example, multiple red, green and blue LEDs or red, blue and green laser diodes can be used to write several million red, green, and blue spots that integrate to form a single high-fidelity image in a mega pixel display image. Such scanning display technologies can utilize a biaxial microelectromechanical scanner (MEMS) and other display/mechanical and electronics devices, such as are disclosed in U.S. Pat. Nos. 6,714,331; 6,795,221; and 6,762,867, which are hereby incorporated herein by reference, and can provide increased spatial resolution. Such displays can deliver an image with a full 30-degree horizontal field of view or more. Such a microdisplay/MEMS device can, for example, be placed in the mirror housing behind the mirror reflective element in an interior (or exterior) mirror assembly such that the image is projected onto the rear of the mirror reflective element, such as is disclosed in U.S. patent application Ser. No. 10/225,851, filed Aug. 22, 2002 by Burgner for VEHICLE INFORMATION DISPLAY, now U.S. Pat. No. 6,847,487, which is hereby incorporated herein by reference.

If the mirror reflector of the mirror element is of the transflective (substantially reflective and at least partially transmitting to light) type, the driver or other occupant in the interior cabin of the vehicle can view the image (being back-projected onto the rear of the mirror reflective element) by viewing the mirror reflective element. This is because the front surface of the reflective element will typically reflect about 4 percent of the light incident on the reflective element toward the driver of the vehicle. Thus, if the display illumination (projected through the reflective element from behind the reflective element and within the mirror casing) does not dominate or distinguish over the reflectance off of the front surface of the mirror reflective element, the display illumination and information may appear washed out due to the reflected image that is reflecting off of the front surface of the reflective element. Such washout may be particularly noticeable during high ambient lighting or daytime lighting conditions. Because back-projected microdisplays can have a very high image brightness (due to use of very high brightness LEDs or lasers as illuminators), image wash-out during driving under high ambient lighting conditions (such as on a sunny day) is reduced using such scanning image microdisplay technology compared to use, for example, of TFT LCD displays.

Also, such MEMS technology can be used in a heads-up-display (HUD) system, such as the MicroHUD™ head-up display system available from MicroVision Inc. of Bothell, Wash. (and such as described in U.S. patent application Ser. No. 11/029,695, filed Jan. 5, 2005 by Lindahl et al. for MIRROR ASSEMBLY, now U.S. Pat. No. 7,253,723, which is hereby incorporated herein by reference). This provides a compact heads-up display capable of meeting specific size and performance specifications. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving.

The high-resolution MicroHUD™ display may be completely reconfigurable, enabling virtually any content to be displayed, including video or animated icons and graphics. Advantageously, such a MicroHUD™ display unit may be included at or within an interior rearview mirror assembly or a windshield electronics module/accessory module so as to project its image therefrom onto the inner surface of the windshield. This unique packaging of a HUD or projection image displayer into an interior rearview mirror assembly or a windshield electronics module/accessory module has advantages over conventional placement of such HUD projectors into the dashboard of the vehicle. These advantages include that the HUD image projector need not find space in an already crowded dashboard (where, for example, a center information cluster may want space or where HVAC ducts/components may run). Also, incorporation of the HUD projector in the likes of the mounting portion of the interior mirror assembly or into a windshield electronics module/accessory module can allow a HUD display to be provided more readily as an optional accessory for the vehicle or as a dealership option or aftermarket device. A variety of images (such as, for example, iconistic or graphical or video or textural or alphanumerical or numerical or the like) can be displayed, such as information from a side object/blind spot monitoring system, such as the types described in U.S. Pat. No. 5,929,786, and/or U.S. patent applications Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 10/209,173, filed Jul. 31, 2002 by Schofield for AUTOMOTIVE LANE CHANGE AID, now U.S. Pat. No. 6,882,287, and/or U.S. provisional application Ser. No. 60/638,687, filed Dec. 23, 2004 by Higgins-Luthman for OBJECT DETECTION SYSTEM FOR VEHICLE, which are hereby incorporated herein by reference.

Also, a full video image captured by the likes of a reversing camera or a forward facing night vision camera or a sidelane-monitoring camera can be displayed on/via the vehicle windshield (or elsewhere) by the likes of a MicroHUD™ device and, conceptually, thus replacing the exterior mirrors with cameras. For example, a driver sidelane video image and a passenger sidelane video image, both preferably with graphic overlays thereon, can be displayed at respective sides of the vehicle windshield via a MEMS-based display system (such as via a MicroHUD™ HUD display device) and with the image visible to the driver by viewing the vehicle windshield (such as via an optical image combiner created on the inner glass surface of the windshield and/or onto the polymeric laminating interlayer (typically a sheet of polyvinyl butyral or of silicone or the like) utilized in the laminate windshield).

Optionally, a laser emitter or laser diode or the like may be positioned within the mirror casing and behind the reflective element, and may be used to emit radiation onto a reflector (such as a microelectromechanical scanner (MEMS)) within the mirror casing that reflects the radiation toward and through the mirror reflective element for viewing by a driver of the vehicle (such as by utilizing aspects described in U.S. patent application Ser. No. 10/225,851, filed Aug. 22, 2002 by Burgner for VEHICLE INFORMATION DISPLAY, now U.S. Pat. No. 6,847,487; and/or U.S. provisional applications Ser. No. 60/607,963, filed Sep. 8, 2004 by Schofield for IMAGING SYSTEM FOR VEHICLE; Ser. No. 60/642,227, filed Jan. 7, 2005; and Ser. No. 60/644,903, filed Jan. 19, 2005 by Byers et al. for MIRROR ASSEMBLY WITH HEATER ELEMENT, which are all hereby incorporated herein by reference).

Such a laser scanning display device may provide enhanced display characteristics for enhanced viewing of the display at the reflective element by the driver of the vehicle. Typically, in order to use a laser to back light a display area (such as an area of about two cm square or thereabouts), the laser beam may be projected through an optic that broadens the beam to the desired size, whereby the intensity of the beam is reduced. An advantage of such scanning display technologies is the intensity of the display delivered, and thus its ability to be seen even under high ambient driving conditions (such as a sunny day). For example, should a standard backlit TFT LCD display be placed behind a transflective mirror element in the likes of an interior rearview mirror assembly, the front or first surface reflection off the front glass surface (typically around 4 percent of the light incident thereon) often far exceeds the intensity of the light transmitted through the transflective mirror reflective element used. Such transflective mirrors also reflect coincident with the reflection off the front surface, and thus further exasperate the washout of the display image being transmitted/emitted through the reflective element. Even if the reflective coating is locally fully removed to create a light transmitting window, reflectivity off the front glass surface often causes display washout and inability to appropriately read what is being viewed at the display. This is particularly problematic for video display (such as for the likes of a rear backup event or side lane maneuver event or the like).

Thus, one advantage of use of such a scanning display technology (such as described in further detail below) is that the full intensity of the laser is used, but by using the movable mirror/reflector of the microelectromechanical scanner (MEMS), the narrow point-like, super high intensity beam rapidly moves across the display image dimension at a rate that is faster than the eye/brain can register, such that the eye/brain perceives a continuous (or substantially continuous) super bright image. Thus, using the concepts of the present invention as described below, a full video image can effectively be projected through or on a surface of the rearview mirror reflective element in a manner not unlike what can be seen during outdoor laser displays or the like (such as when images and video is laser written on the sides of buildings or clouds or the like). Also, multiple lasers of the same color can be focused so that their beams coincide at roughly the same point on the MEMS reflector so that the intensity of any one image element as written is correspondingly enhanced.

Figure 5:
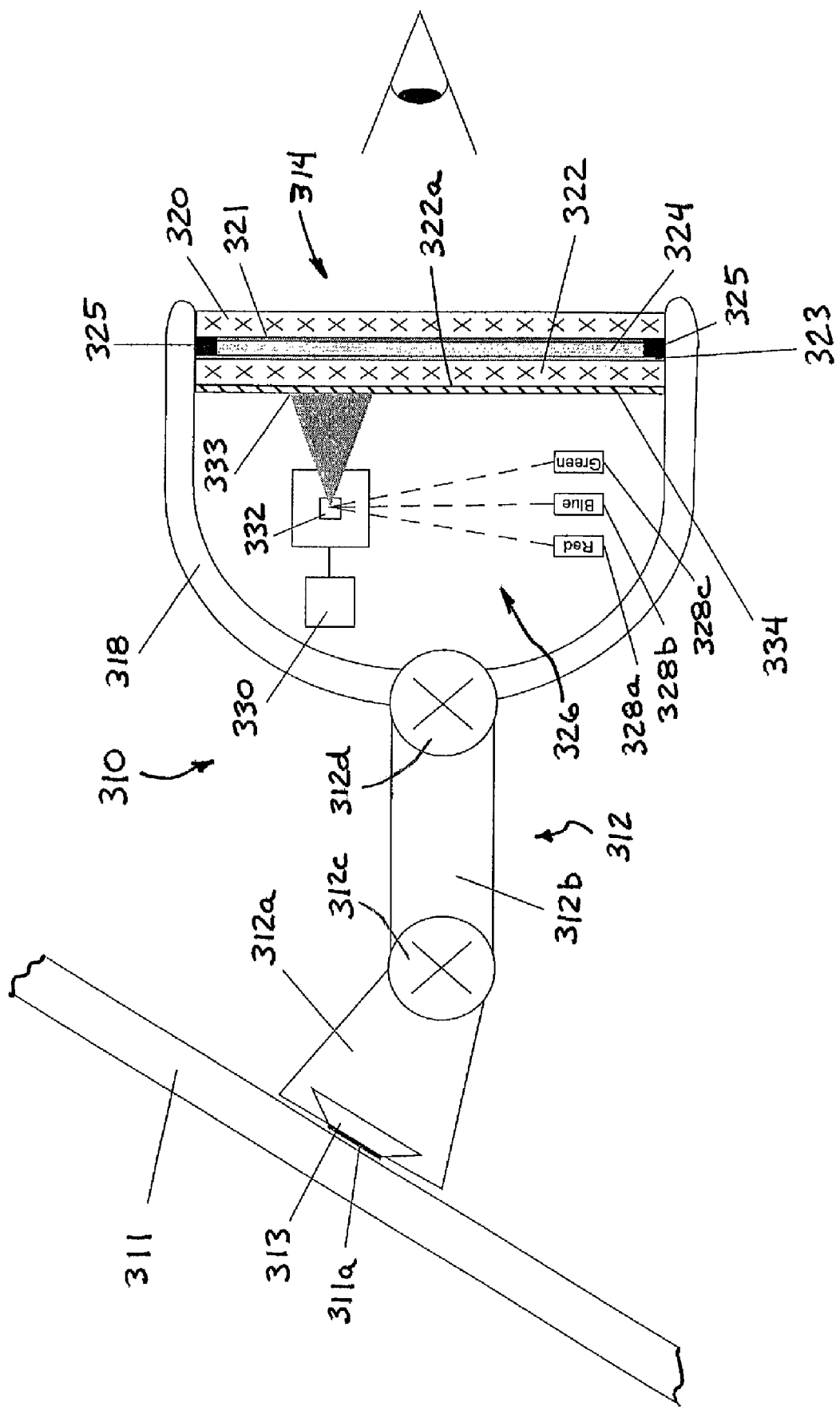
FIG. 5 is a sectional view of an interior rearview mirror assembly incorporating a laser display device in accordance with the present invention.

For example, and with reference to FIG. 5, an interior rearview mirror assembly 310 may be pivotally or adjustably mounted to an interior portion of a vehicle, such as via a double ball mounting or bracket assembly 312. For example, the bracket assembly 312 may include a mirror mount 312a that is mountable to a mounting button 313 adhered or bonded to an interior surface 311a of a vehicle windshield 311. The bracket assembly 312 may also include a mounting arm 312b that is pivotally attached to the mirror mount 312a at a first pivot joint 312c and that is pivotally attached to the mirror casing or mirror head at a second pivot joint 312d. Other means for adjustably mounting the mirror head to an interior portion of the vehicle may be implemented without affecting the scope of the present invention.

Mirror assembly 310 includes an electro-optic or electrochromic reflective element 314 supported at or in a housing or casing 318. The mirror assembly 310 includes a scanning display device 326 that is operable to display information (such as text, alphanumeric characters, icons, images, video images, or other indicia or information or the like) at the reflective element 314 for viewing by a driver of the vehicle. Advantageously, display device 326 is housed behind (to the rear of) the mirror reflective element and thus is within mirror casing 318. Thus, the automaker may acquire and install mirror assembly 310 (with the scanning display capability included) across a variety of vehicle models and lines. Reflective element 314 includes a front substrate 320 and a rear substrate 322 and an electro-optic medium 324 disposed therebetween with a seal 325 encompassing the electro-optic medium, as is known in the electro-optic mirror arts. The front substrate 320 includes a transparent conductive coating or layer 321 at its rear surface (commonly referred to as the second surface of the reflective element), while the rear substrate 322 includes a conductive coating 323 at its front or forward surface (commonly referred to as the third surface of the reflective element).

The reflective element may comprise a transflective reflective element that allows light from the display device 326 to pass therethrough for viewing by the driver of the vehicle, such as by utilizing principles described in U.S. Pat. Nos. 6,690,268; 5,668,663 and/or 5,724,187, and/or in U.S. patent applications Ser. No. 10/054,633, filed Jan. 22, 2002 by Lynam et al. for VEHICULAR LIGHTING SYSTEM, now U.S. Pat. No. 7,195,381; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. provisional applications Ser. No. 60/630,061, filed Nov. 22, 2004 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; Ser. No. 60/563,342, filed Apr. 19, 2004; Ser. No. 60/644,903, filed Jan. 19, 2005; Ser. No. 60/667,049, filed Mar. 31, 2005 by Byers et al. for MIRROR ASSEMBLY WITH HEATER ELEMENT; Ser. No. 60/653,787, filed Feb. 17, 2005 by Karner et al. for MOUNTING ASSEMBLY FOR MIRROR AND METHOD OF MAKING SAME; Ser. No. 60/642,227, filed Jan. 7, 2005; Ser. No. 60/638,250, filed Dec. 21, 2004; Ser. No. 60/624,091, filed Nov. 1, 2004; and Ser. No. 60/609,642, filed Sep. 14, 2004, and/or PCT Application No. PCT/US03/40611, filed Dec. 19, 2003 by Donnelly Corp. et al. for ACCESSORY SYSTEM FOR VEHICLE, which are all hereby incorporated herein by reference. Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference, can be advantageous because such elemental semiconductor mirrors (such as can be formed by depositing a thin film of silicon) can be greater than 50% reflecting in the photopic (SAE J964a measured), while being also substantially transmitting of light (up to 20% or even more). Such silicon mirrors also have the advantage of being able to be deposited onto a flat glass substrate and to be bent into a curved (such as a convex or aspheric) curvature, which is also advantageous since many passenger-side mirrors are bent or curved.

Display device 326 comprises a scanning beam display system that includes a plurality of laser light sources or diodes 328a, 328b, 328c, a controller 330 and a microelectromechanical scanner (MEMS) 332. The display device 326 is contained within the interior casing 318 of mirror assembly 310. The controller 330 receives and/or generates image signals that control the intensity, mix and on-time of the light output by the three laser diodes 328a, 328b, 328c. The controller 330 also establishes the coordinates for the movable elements of the MEMS assembly 332 so that the individual picture elements (pixels) of the displayed image (as displayed at the display area or region 333 at the reflective element 314) are created for view by the driver or other vehicular occupant. For monochrome (one-color) systems, only one laser diode source may be used. Optionally, for full-color displays, three light sources (e.g., red, green and blue) are modulated and merged to produce an image element of the appropriate color. Under the control of controller 330, a horizontal and vertical scanner or a single micro-electromechanical scanner (MEMS) 332 directs the light beams received from laser diodes 328a, 328b, 328c, and projects them onto the rear of (and/or into the body of) mirror reflective element 314 to create the image viewed. Optics (not shown) may be included as desired to achieve the desired spatial and resolution dimensions displayed.

For example, mirrors and/or lens elements or other refractive or diffractive and/or reflective optical elements can be used to project the rapidly scanned beam or beams of light onto the rear of the mirror element (and/or into the body thereof) to create the image seen. Such a scanned-beam automotive mirror display can deliver very high resolution, very high intensity images, with the resolution being limited principally by diffraction and optical aberrations in the light sources used within the mirror casing. Optionally, the rear surface 322a of the rear substrate 322 of the reflective element 314 may include a diffuser coating or layer/combiner 334 or other diffuser means or the like, and the diffuser coating or layer or area may be over substantially the entire rear surface 322a or may be over only that portion of the rear or fourth surface rastered by light reflected off the MEMS 332 that creates the display image. Also, and optionally, diffuser coatings and/or layers/combiners may be included within the body of the mirror reflective element, such as on the third surface of the electro-optic reflective element.

Although illustrated as a transflective mirror element, the reflective coating may be locally removed from a non-transflective mirror element to create a window for viewing the display thereat or therethrough. The window region may include a diffuse coating and/or layer/combiner or the like, such as on the rear surface of the reflective element (such as if the reflective element is an electro-optic or electrochromic reflective element or a non-electro-optic or prismatic reflective element) or on the third surface (such as if the reflective element is a electro-optic or electrochromic reflective element), if desired.

The laser diodes may be rastered or scanned at a desired rate over the MEMS reflector so that a generally continuous image is created by reflection off the MEMS and onto/into and as viewed through the reflective element. In the illustrated embodiment, the laser diodes are positioned to project or emit or radiate their laser beams so that they are incident on the electromechanically moved portion of the MEMS and whereby the laser beams are reflected toward the reflective element by the MEMS reflector.

The MEMS 332 may be positioned within the casing and angled or oriented to reflect illumination or radiation from the laser diodes 328a, 328b, 328c toward the rear surface of the reflective element 314. The reflective surface of the MEMS 332 may be created on a chip, and may be adjusted to provide the desired projection or reflection angle through the reflective element 314 for viewing by a driver of the vehicle. The MEMS reflector may be electrically adjusted and/or electromechanically adjusted to provide the appropriate or desired information or icon or image for the laser beams to project onto and through the reflective element. The laser diodes 328a, 328b, 328c may comprise any laser diodes, such as, for example, laser diodes of the types commercially available from Cree Research Inc. of Durham, N.C., which offers different color laser diodes, such as visible red laser diodes and/or blue laser diodes, such as gallium nitride based blue lasers, and other colors as may be desired, such as, for example, green.

Because of the high intensity illumination provided by such laser diodes, the intensity at the display region of the reflective element will be sufficient to dominate the reflection of the rearward scene off of the front surface of the front substrate of the reflective element, and thus will not appear washed out, even during high ambient lighting conditions, such as on a sunny day or the like. Optionally, the intensity of the laser diodes may be adjusted, such as via manual adjustment and/or via automatic adjustment, such as in response to the ambient light levels in the cabin of the vehicle or in the vicinity of the display. The display information may be associated with any accessory or component or feature of the interior rearview mirror assembly or of the vehicle, such as point-to-point navigational instructions, status information for various functions, such as passenger side airbag status, tire pressure status and/or the like, or compass heading or temperature information or other information or the like.

Also, a video display and/or other information display may be located at the interior mirror assembly (or at a windshield electronics module/accessory module) that utilizes a Micro-Electro-Mechanical-Systems (MEMS) structure combined with thin film optics, such as is available Iridigm of San Francisco, Calif. under the tradename iMoD™ technology. This display technology (such as is described in U.S. Pat. Nos. 6,794,119; 6,741,377; 6,710,908; 6,680,792; 6,674,562; 6,650,455; 6,589,625; 6,574,033; 5,986,796; and 5,835,255, which are hereby incorporated herein by reference) is designed to deliver lower power consumption and excellent display image quality, and can withstand extreme temperatures and can be viewed in substantially any environment, including bright sunlight.

Although shown and described as being incorporated into an electro-optic or electrochromic interior rearview mirror assembly, it is envisioned that the scanning beam display system may be incorporated into a prismatic interior rearview mirror assembly or a transflective prismatic rearview mirror assembly (such as by utilizing principles described in PCT Application No. PCT/US03/29776, filed Sep. 19, 2003 by Donnelly Corp. et al. for MIRROR REFLECTIVE ELEMENT ASSEMBLY; U.S. patent applications Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference). Optionally, the laser scanning beam display system may be incorporated into an exterior rearview mirror assembly without affecting the scope of the present invention. For exterior rearview minor applications, the display system may function to display blind spot detection icons or information, or turn signals or security lights or the like, at the reflective element of the exterior rearview mirror assembly of the vehicle. For example, a non-electro-optic/fixed reflectivity reflector may use an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference, can be advantageous because such elemental semiconductor mirrors (such as can be formed by depositing a thin film of silicon) can be greater than 50% reflecting in the photopic (SAE J964a measured), while being also substantially transmitting of light (up to 20% or even more). Such silicon mirrors also have the advantage of being able to be deposited onto a flat glass substrate and to be bent into a curved (such as a convex or aspheric) curvature, which is also advantageous since many passenger-side mirrors are bent or curved.

Optionally, the display may comprise a laser emitter or laser diode or the like, which may be positioned within the mirror casing and behind the reflective element, and may be used to emit radiation onto a reflector (such as a microelectromechanical scanner (MEMS)) within the mirror casing that reflects the radiation toward and through the mirror reflective element for viewing by a driver of the vehicle (such as by utilizing aspects described in U.S. patent application Ser. No. 10/225,851, filed Aug. 22, 2002 by Burgner for VEHICLE INFORMATION DISPLAY, now U.S. Pat. No. 6,847,487; and/or U.S. provisional applications Ser. No. 60/644,903, filed Jan. 19, 2005; Ser. No. 60/642,227, filed Jan. 7, 2005 by Karner et al. for MOUNTING ASSEMBLY FOR MIRROR AND METHOD OF MAKING SAME; and/or Ser. No. 60/607,963, filed Sep. 8, 2004 by Schofield for IMAGING SYSTEM FOR VEHICLE, which are hereby incorporated herein by reference).

The light emitting device, such as a laser diode or light emitting diode (LED) or the like (such as described in U.S. provisional applications Ser. No. 60/644,903, filed Jan. 19, 2005; Ser. No. 60/642,227, filed Jan. 7, 2005 by Karner et al. for MOUNTING ASSEMBLY FOR MIRROR AND METHOD OF MAKING SAME; and/or Ser. No. 60/607, 963, filed Sep. 8, 2004 by Schofield for IMAGING SYSTEM FOR VEHICLE, which are hereby incorporated herein by reference), of the display may be controlled by a controller, which may modulate the intensity or on/off characteristic of the emitted light while the light emitting device or laser is rastered (or moved rapidly back and forth in generally horizontal or vertical scanning lines over a display area), in order to create the desired display via the points where the light emitting device is intensified or activated. Because the laser diode may be rastered at a high rate over substantially the entire display area but only activated/intensified at appropriate locations to form the desired display, the narrow point like, super high intensity beam (that is activated/intensified/modulated as the laser diode is rapidly moved across the display image dimension at a rate that is faster than the eye/brain can register) is perceived by the human eye/brain as a continuous (or substantially continuous) super bright image, even though only one light "dot" or beam may actually be present at a time at the display. A person viewing the display thus would see the display as the desired form or character and substantially constantly and brightly illuminated by the rastered and modulated laser diode.

Optionally, the light emitting device may be substantially constantly activated and directed/rastered toward a display window, such as a liquid crystal display (LCD) or the like, with a window established in the desired form, so that light emitted by the light emitting device (such as a laser diode, a light emitting diode (LED) or an organic light emitting diode (OLED) or the like) projects or shines through the display window/element, such that the display character or icon or information or video or the like is viewable at the reflective element by the driver of the vehicle. The display window may comprise a substantially transparent or translucent shape or character or icon or the like, with a darkened or substantially opaque area surrounding the window, such that light emitted by the light emitting device passes through or transmits through the window, but is substantially blocked or attenuated by the surrounding opaque area of the display. The LCD display may be operable to adjust the window and opaque regions to adjust or modulate or change or control the information being displayed by the light passing through the display. For applications where the light emitting device may be rastered at a high rate over substantially the entire display area (such as over the LCD), and with the illumination beam (such as the narrow point like, super high intensity beam of a laser emitting device) rapidly moving across the display image dimension at a rate that is faster than the eye/brain can register, the eye/brain perceives a continuous (or substantially continuous) bright image, even though only one light "dot" or beam may be present at a time through the display window. The light emitting device thus may be constantly or substantially constantly activated/energized, with the display being formed/created by the window through which the light passes as the light beam is rastered or scanned over the display device. A person viewing the display thus would see the display as the character of the display window as substantially constantly and brightly illuminated by the rastered laser diode or other light emitting device, such as an LED or OLED or the like.

Note that is desirable, and in many cases preferable, that the laser light source be only enabled when the MEMS unit is functioning and causing a rastering or the like of the reflected laser beam. This is to limit or substantially preclude or prevent the possibility of the laser beam being stationary for any prolonged period with a concomitant possibility of eye damage to viewer in the vehicle. Thus, the circuitry/software controlling activation/illumination of the laser light source can be tied to the circuitry/software controlling activation/movement of the movable reflector of the MEMS unit, such that should the system fail and the MEMS unit not move or cease rastering, then the laser source is extinguished/turned off so that danger to a viewer from laser eye burn or the like is obviated.

Optionally, a projected information display and/or virtual human machine interface (HMI) may be created at a surface of an interior mirror assembly or a windshield electronics module/accessory module utilizing a virtual data entry device system, such as is disclosed in U.S. Pat. Pub. No. 20020075240, published Jun. 20, 2002, which is hereby incorporated herein by reference. Thus, an optically generated image of a key-entry tablet or an input menu or user-actuation button/input or an icon or an informational message or the like can be projected, for example, onto a surface of the interior rearview mirror or elsewhere within the cabin of the vehicle. The projected image may include at least one input zone/user interface zone that is actuatable by an action performed thereon or thereat by a user. The system includes a sensor operative to sense the action performed on or at the at least one input zone, and to generate signals in response to the detected action. A control or processor in communication with the sensor is operable to process the signals for performing an operation associated with the at least one input zone.

For example, a template of the desired interface (such as a keyboard or input options or the like) may be projected onto an interface surface (such as the reflective element of the interior mirror assembly). The template is produced by illuminating an optical element (such as a holographic optical element) with a laser diode (such as a red laser diode or the like). Because the template functions only as a reference for the user and is not involved in the detection process, the template may optionally be printed at a desired surface, such as at a portion of the reflective element or casing of the mirror assembly (or at a casing or element of a windshield electronics module or accessory module or the like).

An infrared plane of light may be generated at and slightly spaced from and parallel to the interface surface. The light may be substantially invisible to the user and is positioned just a few millimeters away from the interface surface (such as along the first surface of the reflective element and a few millimeters toward the driver or toward the rear of the vehicle from the first surface of the reflective element). Accordingly, when a user touches a portion of the projected interface at the interface surface (for example, the first surface of the reflective element of the interior mirror assembly), light is reflected from the plane in the vicinity of the respective input or key that was "touched" and directed toward the sensor module.

The reflected light from the user interaction with the interface surface is received by or imaged onto an imaging array sensor, such as a CMOS image sensor or the like, in a sensor module. The reflected light may pass through an infrared filter before being imaged onto the CMOS sensor. The sensor control or processor or chip then may conduct a real-time determination of the location of the reflected light, and may be operable to track multiple reflection events substantially simultaneously, and can thus support both multiple inputs/keystrokes and overlapping cursor control inputs and the like. The micro-controller (which may be positioned in the sensor module) receives the positional information corresponding to the light flashes from the sensor control or processor, and interprets the events and communicates them through an appropriate interface to the appropriate external device or devices.

The projected interface and sensor system thus may provide a keypad or input interface at the reflective element for actuation/use by the driver or occupant of the vehicle. The keypad or input interface may be projected onto or at the reflective element only when it is desired to be used, such that the reflective element is substantially unaffected by the incorporation of the interface and sensor system at the interior rearview mirror assembly. The sensor may detect the input action performed/selected by the user and the control may then control or activate/deactivate or modulate or adjust the appropriate accessory or system or device of the vehicle.

The information or input interface that is projected may provide various inputs/actions, such as, for example, inputs for a video display of the vehicle (such as disclosed in U.S. Pat. Nos. 5,760,962 and/or 5,877,897; and/or PCT Application No. PCT/US03/40611, filed Dec. 19, 2003 by Donnelly Corp. et al. for ACCESSORY SYSTEM FOR VEHICLE, and/or U.S. provisional applications Ser. No. 60/630,061, filed Nov. 22, 2004 by Lynam et al. for MIRROR ASSEMBLY WITH VIDEO DISPLAY; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, which are hereby incorporated herein by reference), a communications system of the vehicle (such as disclosed in U.S. Pat. Nos. 6,717,524; 6,650,233; 6,243,003; 6,278,377; and/or 6,420,975, and/or PCT Application No. PCT/US03/30877, filed Oct. 1, 2003, which are hereby incorporated herein by reference), a navigational system of the vehicle (such as the types described in U.S. Pat. No. 6,477,464, and U.S. patent applications Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287, 178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE, which are hereby incorporated herein by reference), light sources (such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, which are hereby incorporated herein by reference) and/or the like. Optionally, different interfaces may be provided for different accessories or devices or functions, whereby the appropriate interface for a particular accessory or device or function may be selected by the user, and the desired particular function of that accessory or device may then be selected and activated or deactivated or controlled by "touching" the appropriate location at the surface (such as the first surface of the reflective element) upon which the interface keypad or input is projected.

Other types of displays or display elements or devices and controls for such displays or display elements or devices may be implemented with the imaging system of the present invention, without affecting the scope of the present invention.

The imaging system of the present invention may be utilized to identify particular traffic control signs or signage by their spectral signature as well as their geometric organization. For example, red octagons may be identified as stop signs, yellow triangles as caution signs, and the like, while black characters on a rectangular white background may be identified as a speed limit sign (in certain zones or regions or countries). These capabilities are a result of the present invention providing a significant reduction in the amount of data to be processed because the image forward of the vehicle is captured in a manner which preselects data. Preselection of data is accomplished by configuring the imaging device or sensor array, including the optics thereof, to consider the spatial, as well as the spectral, characteristics of light sources and objects in the captured images, such as via utilization of principles described in U.S. Pat. No. 5,796,094, which is hereby incorporated herein by reference.

More particularly, image processor 16 receives an input signal generated by imaging device 14 and interrogates or processes the imaging device output to detect traffic control signage in the captured image of the forward scene. The image processor 16 may identify what type of sign is in the captured image based on the geometrical shape of the sign, the size of the sign and the location of the sign relative to the vehicle or road. For example, the image processor may process the image to determine the location of the detected object or sign relative to the field of view of the imaging device or camera and, thus, relative to the vehicle and to the side of the road where such a sign is expected to be found (typically at the side of the vehicle that is opposite to the driver's side of the vehicle). The imaging processor may determine the shape, size, color and/or location of the detected sign or object via any suitable sign recognition and sign information delineation/discrimination algorithm/software utilized by the imaging system. Such software or algorithm may incorporate any suitable processing means, such as by utilizing aspects described in U.S. Pat. Nos. 5,550,677; 5,670,935; 5,796,094; 6,498,620; 5,877,897; 6,396,397; 6,353,392 and 6,313,454, and/or U.S. patent application Ser. No. 10/427,051, filed Apr. 30, 2003 by Pawlicki et al. for OBJECT DETECTION SYSTEM FOR VEHICLE, now U.S. Pat. No. 7,038,577, which are hereby incorporated herein by reference. For example, the image processor may process the image via an edge detection algorithm or the like, such as described in U.S. Pat. Nos. 6,353,392 and 6,313,454, and/or U.S. patent application Ser. No. 10/427,051, filed Apr. 30, 2003 by Pawlicki et al. for OBJECT DETECTION SYSTEM FOR VEHICLE, now U.S. Pat. No. 7,038,577, which are hereby incorporated herein by reference.

In a preferred embodiment, the imaging device comprises an imaging array sensor that is responsive to light and that includes colored filters or a filter array at or over the pixels of the sensor, such that the pixels are spectrally responsive to different colors of light, such as described in U.S. Pat. Nos. 5,550,677; 5,670,935; 5,796,094; 6,498,620; 5,877,897; 6,396,397; and 6,313,454, which are hereby incorporated herein by reference. The filters or filter array may be selected to provide enhanced recognition of colors within a selected spectral band or bands of light. The imaging device and the imaging system thus may have enhanced recognition of certain colors that may be expected to be used on the signs or signage of interest (or may have enhanced rejection of certain spectral bands that may not be used on signage of interest).

Such traffic control signage, such as speed limit signs, exit signs, warning signs, stop signs, yield signs and/or the like, is typically regulated and various types of these signs must have certain specified, standard geometric shapes (such as a triangle for a yield sign, an octagon for a stop sign and the like), and must be at a particular height and at a particular location at or distance from the side of the road, and must have a specific type/color of lettering on a specific colored background (for example, a speed limit sign is typically a predefined shape, such as rectangular or circular, and has alphanumeric characters or letters and/or numbers that are a contrast color to a background color, such as black letters/numbers on a white background, while an exit sign typically has a different shape and/or contrast colors, such as white lettering on a green background). The imaging device is arranged at the vehicle, preferably in the interior cabin and viewing through the windshield (and thus protected from the outdoor elements, such as rain, snow, etc.), with a field of view that encompasses the expected locations of such signage along the side of roads and highways and the image processor may process the captured image to determine if the captured images encompass an object or sign that is at the expected location and that has the expected size, color and/or shape or the like. Therefore, the imaging processor 16 may readily determine what type of sign is detected by its geometric shape, size, color, text/characters and its location relative to the imaging device and the vehicle.

Preferably, the image processing algorithm or software includes a sign recognition stage or step or portion or process or routine that processes the image to determine whether the detected sign or object is of interest and, if so, what type of sign is detected. Once the sign recognition stage is satisfied, the image processing algorithm or software proceeds or passes to a character recognition stage or step or portion or process or routine, where the image is processed further to determine or recognize the characters (such as alphanumeric characters, letters, numbers or icons or indicia or the like) printed or formed or established on the face of the sign, in order to determine the information conveyed by the characters or icons or indicia on the face of the sign. The processor involved thus may only be busied with the character recognition stage once the preceding sign recognition stage has recognized and determined that a speed limit sign (or other sign or signage of interest) within the field of view. The algorithm processed by the image processor may include false signal and/or error reduction routines and protection, whereby instances of errant or unintended/false readings of items or objects other than genuine signage are reduced or suppressed.

Once the type of sign is determined, the imaging system may process the characters (which may be alphanumeric characters or numbers or letters or icons or the like) printed or formed or established on the sign, and no further processing of the sign's size or shape or color or the like need be conducted. The imaging system thus may process the images only enough to determine the type of sign and to determine the characters or information on the face of the sign if necessary, such that reduced processing may be achieved in certain circumstances where the sign type is readily identifiable. For example, a stop sign may be readily identified by its shape and color, such that no further processing may be required to determine the sign type or the characters or information on the face of the sign.

It is further envisioned that the detected color of the characters and/or background may be compared to the regulation or specified sign colors for daytime and/or nighttime lighting conditions. For example, if the vehicle is traveling during high ambient light conditions (which may be determined by processing the output of the imaging device or via a separate ambient light sensor or the like), such as during the daytime, the imaging system may determine the type of sign detected in response to matching the detected sign color to the specified or regulated colors for the sign during daytime lighting conditions, while if the vehicle is traveling during low ambient light conditions, such as below approximately 200 lux or thereabouts, such as during nighttime, the imaging system may determine the type of sign detected by matching the detected sign color to the specified or regulated colors for the sign under headlamp or auxiliary lighting conditions such as typically occur at nighttime.

In different countries or regions, and even along different types of roads or highways, the signage regulations may be different, and the imaging processor may be adjusted accordingly to adapt to the different regulations. It is further envisioned that the imaging system may be automatically adjusted or adapted to the sign regulations in effect at the current location of the vehicle. The current location of the vehicle may be determined via a vehicular navigational system or global positioning system (GPS) or the like, such as the types described in U.S. Pat. Nos. 6,477,464; 5,924,212; 4,862,594; 4,937,945; 5,131,154; 5,255,442; and/or 5,632,092, and/or U.S. patent applications Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE, which are all hereby incorporated herein by reference.

Optionally, a user input may be provided to selectively input the location or zone or region of the vehicle to establish the appropriate setting for the imaging system. For example, a user may change from an "imperial" setting (such as used in the U.S.), where the numbers may be interpreted by the imaging system as being in miles per hour, to a "metric" setting, where the numbers may be interpreted by the imaging system as being in kilometers per hour, such as when the driver drives the vehicle from the U.S. to Canada. Optionally, if the vehicle has a global positioning system (GPS), the setting for a particular location or zone at which the vehicle is located may be automatically set to the appropriate units or setting in response to a signal from the global positioning system that is indicative of the current location or position of the vehicle. Other zones or regions may be selectively or manually input or automatically set to set or calibrate the imaging system for the particular zone or region or country in which the vehicle is traveling (where the numbers may be interpreted according to the units used in that zone or region or country and where the detected signs or objects are compared to the expected sign shapes, sizes, colors and the like of that zone or region or country).

Optionally, the expected or recognized or accepted sign size, shape, color, etc. may be looked up in a table or database or the like by the image processor, in order to determine if a detected sign or object is within the expected or specified parameters of a particular type of sign and, thus, to determine if the detected object or sign qualifies as a particular type of traffic control sign. For example, if the imaging system detects an object that is generally in the area and of the size of a traffic control sign, the system may further analyze the sign parameters in view of a table or listing or database of parameters of various signs along different types of roads or the like, in order to determine if the detected sign qualifies as one of the particular traffic control signs in the table or set of data. The imaging system thus may determine what type of sign has been detected by matching the parameters of the detected sign or object with the expected or specified parameters of one of the signs listed in the look-up table or database.

After the sign has been identified as a certain type of sign, further processing of the sign may commence to determine or read the characters or information on the face of the sign. The imaging processor 16 may further identify or read the characters on the detected sign via recognition of the shapes or geometries and arrangement of the characters on the sign, such as via utilization of the image processing and/or edge detection discussed above. For example, after the image processor has identified a detected sign as being representative of a speed limit sign, the image processor may determine what numbers are shown on the sign to determine the speed limit for the zone or area through which the vehicle is traveling. The imaging system knows that the characters "read" from the sign are for the speed limit (rather than for an exit number or a billboard advertisement or the like) based on the initial analysis of the sign's size/shape/color/location discussed above. The image processor then may generate an output to cause the display device to display information about the current speed limit as indicated by the detected sign and characters. For example, the display device may display the speed limit to the driver of the vehicle.

Optionally, the image processor 16 may receive an input signal from a vehicle speed sensor or sensing means 24, and may display the amount (such as in miles per hour or kilometers per hour or the like) that the vehicle is traveling in excess of (or under) the current speed limit. The speed sensor may comprise any type of sensor or sensing means for determining the speed of the vehicle, such as a wheel speed sensor, a global positioning system or the like. Optionally, the vehicle speed may be determined via processing of the images captured by the imaging device 14, such as via principles described in U.S. patent application Ser. No. 10/427,051, filed Apr. 30, 2003 by Pawlicki et al. for OBJECT DETECTION SYSTEM FOR VEHICLE, now U.S. Pat. No. 7,038,577, and/or U.S. provisional application Ser. No. 60/638,687, filed Dec. 23, 2004 by Higgins-Luthman for OBJECT DETECTION SYSTEM FOR VEHICLE, which are hereby incorporated herein by reference.

Optionally, a desirable display may comprise the actual vehicle speed shown at or near or adjacent to or side by side the actual posted and detected speed limit, in order to provide a visible display of the current speed and the posted or allowed speed limit. It is envisioned that the display may provide numbers or bars or icons or the like to indicate the vehicle speed and posted speed limit for such a display. The display may adjust the display of the speed and/or the posted speed limit (such as by increasing the intensity of the display or flashing the display or the like) if the vehicle speed is above (or below) the posted and detected speed limit by a threshold amount.

Optionally, one or both of the display elements may be highlighted or adjusted in a different manner depending on the driving condition encountered by the vehicle. For example, when the vehicle speed is within the specified threshold/tolerance of the posted speed limit, the display may be set at a particular intensity or color or the like (such as, for example, a green color), but when the vehicle speed is above the specified threshold or tolerance, the display may be adjusted to a different intensity (such as brighter) or color or the like (such as, for example, a red color). Similarly, when the vehicle speed is below the specified threshold/tolerance, the display may be adjusted to a different intensity or color or the like (such as, for example, a blue color). Other intensities or flashing or color changes or highlighting of one or more display elements may be implemented in response to the different driving/speed conditions encountered by the vehicle, without affecting the scope of the present invention.

Optionally, the image processor may provide an alert or warning to the driver when the vehicle speed exceeds a threshold amount over (or under) the posted (and recognized) speed limit. For example, the display device may flash or adjust the intensity of the displayed speed limit or the image processor may actuate an audible signaling device 26 to provide an audible warning, such as a beep or voice warning or the like, when the vehicle speed exceeds (or falls below) the posted and recognized speed limit by a threshold amount (such as approximately five or ten miles per hour above or below the posted limit or the like). For example, the imaging system may provide a higher pitch audible tone when the vehicle speed is above the posted speed limit (or at a threshold amount above the posted speed limit), and may provide a lower pitch audible tone when the vehicle speed is below the posted speed limit (or at a threshold amount below the posted speed limit). Other alerts or signals may be provided by the imaging system, such as tactile/haptic type alerts, such as a rumble or vibration of the seat or steering wheel or the like, without affecting the scope of the present invention. The desired threshold amount may be selectively entered by the driver, such as via a key pad, a touch pad, a voice receiver or the like, such that the imaging system may only provide such a warning when it may be desired by the particular driver of the vehicle. Optionally, it is envisioned that the operation of the vehicle may be influenced by the posted and detected speed limit, such as by a governor or the like that may limit the maximum speed of the vehicle to within a threshold amount above the posted speed limit.

Optionally, the image processor may provide an alert or warning when the detected and posted speed limit changes, such as when the vehicle moves from one speed zone (such as 55 miles per hour or the like) to another speed zone (such as 35 miles per hour or the like), so as to warn the driver to slow down (or to speed up if the later zone has a higher speed limit). For example, when a speed limit is detected that is lower (or higher) than the previously detected speed limit, the image processor may cause the display device to display the new speed limit, and may flash or otherwise change or enhance the display to draw the driver's attention to the display. Optionally, the display device may display a notice that the speed limit has changed, such as "Speed Limit Reduced—Slow Down" or the like. Optionally, the image processor may actuate an audible signaling device to provide a tone or beep or voice message to audibly communicate to the driver that the driving conditions have changed, or may actuate a tactile/haptic signaling device (or other type of signaling device) to provide a tactile or haptic signal (or other type of signal or alert) to the driver of the vehicle to communicate such changes in the driving conditions to the driver of the vehicle.

Optionally, the threshold amount over/under the posted and determined speed limit at which the alert is provided may be dynamic and thus may change depending on the determined speed limit. More particularly, the threshold amount over a posted speed limit may be greater for speed limit zones having higher speed limits, such as 55 miles per hour or above, while the threshold amount may be lower for speed limit zones having lower speed limits, such as 25 miles per hour or 35 miles per hour or less. For example, if the threshold amount is selected to be ten miles per hour over the speed limit when the speed limit is seventy miles per hour, the imaging system may dynamically adjust or reduce the threshold amount for lower speed limit zones, so that the threshold amount may be only, for example, three miles per hour for a 25 miles per hour zone. The imaging system thus may dynamically adapt to the driving conditions or speed limits or zones encountered by the vehicle, because what may be a safe and reasonable amount over a 65 miles per hour speed limit (such as five to ten miles per hour) may be much worse or less safe if applied to a slower zone, such as a 25 miles per hour zone or thereabouts.

The imaging system may also be operable to detect and recognize and read warning signs, such as at turns or hills or the like, or may detect and recognize and read other types of warning signage or the like. For example, the imaging system may detect a warning sign that indicates that a turn is approaching and that the safe speed of travel around the turn is reduced to a lower speed, such as, for example, 45 miles per hour for a turn located in a 55 miles per hour zone, or such as, for example, a reduced speed for an exit ramp off of a highway or freeway or the like. The imaging system may then display the reduced speed limit or reduced recommended speed to alert the driver of the slower speed zone and/or may then generate a warning signal or alert signal (such as a visible and/or audible and/or tactile/haptic signal) to the driver if the current vehicle speed is greater than the reduced or safe or posted speed (or substantially greater than the posted speed or at or above a threshold amount greater than the posted speed or the like). The driver may then be alerted to the potentially hazardous condition and may adjust the speed of the vehicle accordingly.

Optionally, the imaging system may be operable to detect and identify or recognize other types of signs. For example, the imaging system may be operable to detect and recognize a railroad crossing sign and to further recognize that the railroad crossing sign is activated (such as by distinguishing the flashing lights characteristic of a railroad crossing signal) due to an approaching train. The imaging system could then warn the driver that the vehicle is approaching a dangerous condition. Additionally, the imaging system may be operable to detect other signals, such as a school bus stopping signal or a pedestrian road crossing signal or the like. Optionally, the imaging system may be operable to detect road repair or road construction zone signs and may recognize such signs to distinguish when the vehicle is entering a road construction zone. The imaging system may display the reduced speed for the construction zone and/or may provide an alert to the driver of the vehicle that the vehicle is entering a construction zone and that the vehicle speed should be reduced accordingly. The imaging system thus may not only assist the driver in avoiding a speeding ticket, but may provide enhanced safety for the construction workers at the construction zone.

Optionally, the imaging system of the present invention may be associated with or cooperatively operable with an adaptive cruise control 28 (FIG. 2) of the vehicle, such that the cruise control speed setting may be adjusted in response to the imaging system. For example, an adaptive speed control system may reduce the set speed of the vehicle in response to the imaging system (or other forward facing vision system) detecting a curve in the road ahead of the vehicle (such as by detecting and recognizing a warning sign at or before such a curve). The vehicle speed may be reduced to an appropriate speed for traveling around the curve without the driver having to manually deactivate the cruise control. For example, the vehicle speed may be reduced to the amount of the reduced or safe limit shown on the warning sign or the like. The adaptive speed control may then resume the initial speed setting after the vehicle is through the turn or curve and is again traveling along a generally straight section of road.

Optionally, the adaptive speed control may adjust the speed setting of the vehicle in response to the imaging system recognizing and identifying a change in speed limit. For example, if the vehicle is initially traveling at seventy miles per hour in a 65 miles per hour zone, and the imaging system detects a reduced speed limit to 45 miles per hour, the adaptive speed control may reduce the speed setting to fifty miles per hour or thereabouts. The imaging system may also provide the alert or warning to the driver when the speed limit change is detected, as discussed above. The adaptive speed control may be any type of adaptive speed control, and may utilize aspects of the controls of the types described in U.S. patent application Ser. No. 10/427,051, filed Apr. 30, 2003 by Pawlicki et al. for OBJECT DETECTION SYSTEM FOR VEHICLE, now U.S. Pat. No. 7,038,577, and/or U.S. provisional application Ser. No. 60/638,687, filed Dec. 23, 2004 by Higgins-Luthman for OBJECT DETECTION SYSTEM FOR VEHICLE, which are hereby incorporated herein by reference, without affecting the scope of the present invention.

Although described above as being operable to determine the speed limit or reduced speed posted on a sign detected by the imaging system, the imaging system of the present invention may also process the captured images to determine characters on other types of signs as well, such as exit signs or the like. For example, the imaging system may be associated with or in communication with a navigational system, and may signal to the driver that the exit sign for a desired exit is approaching to limit or substantially preclude the possibility that the driver may miss the desired or targeted exit. The navigational system may comprise any type of navigational system, such as the types described in U.S. Pat. Nos. 6,477, 464; 5,924,212; 4,862,594; 4,937,945; 5,131,154; 5,255,442; and/or 5,632,092, and/or U.S. patent applications Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645, 762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422, 378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE; and/or PCT Application No. PCT/US04/015424, filed May 18, 2004 by Donnelly Corporation et al. for MIRROR ASSEMBLY FOR VEHICLE, which are all hereby incorporated herein by reference, without affecting the scope of the present invention.

Optionally, the imaging system may be operable to utilize data or information pertaining to a lane change and/or an exit sign or the like, and an adaptive cruise control system may adjust the speed of the vehicle or the acceleration of the vehicle in response to such lane divergent information and/or exit ramp information. For example, the imaging system may detect an exit sign along a freeway or the like, and may detect a lane change by the subject vehicle onto the exit ramp. The adaptive cruise control system may receive an input that is indicative of such detections and/or image processing, and may adjust the speed of the vehicle accordingly. For example, the adaptive cruise control system may decrease the speed of the vehicle and/or may inhibit acceleration of the vehicle in response to such detections/image processing, in order to limit or substantially preclude potentially hazardous conditions where the vehicle may accelerate to an unsafe speed on the exit ramp.

As discussed above, the imaging device and/or the display device may be positioned at or in an interior rearview mirror assembly of the vehicle. For example, the imaging device and/or the display device and/or the image processor may be positioned within a prismatic mirror assembly, such as a prismatic mirror assembly utilizing aspects described in U.S. Pat. Nos. 6,318,870; 5,327,288; 4,948,242; 4,826,289; 4,436, 371; and 4,435,042, and PCT Pat. Application No. PCT/US04/015424, filed May 18, 2004 by Donnelly Corporation et al. for MIRROR ASSEMBLY FOR VEHICLE, which are hereby incorporated herein by reference. Optionally, the prismatic reflective element may comprise a conventional prismatic reflective element or prism or may comprise a prismatic reflective element of the types described in PCT Application No. PCT/US03/29776, filed Sep. 19, 2003 by Donnelly Corp. et al. for MIRROR REFLECTIVE ELEMENT ASSEMBLY; U.S. patent applications Ser. No. 10/709,434, filed May 5, 2004 by Lynam for MIRROR REFLECTIVE ELEMENT, now U.S. Pat. No. 7,420,756; and Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference, without affecting the scope of the present invention.

Alternately, for example, the interior rearview mirror assembly may comprise an electro-optic or electrochromic mirror assembly, which may utilize some of the principles described in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as described in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein; and/or as described in U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 6,690,268; 5,668,663 and/or 5,724,187, and/or in U.S. patent application Ser. No. 10/054, 633, filed Jan. 22, 2002 by Lynam et al. for VEHICULAR LIGHTING SYSTEM, now U.S. Pat. No. 7,195,381; PCT Application No. PCT/US03/29776, filed Sep. 9, 2003 by Donnelly Corp. et al. for MIRROR REFLECTIVE ELEMENT ASSEMBLY; PCT Application No. PCT/US03/ 35381, filed Nov. 5, 2003 by Donnelly Corp. et al. for ELECTRO-OPTIC REFLECTIVE ELEMENT ASSEMBLY; and/ or PCT Application No. PCT/US03/40611, filed Dec. 19, 2003 by Donnelly Corp. et al. for ACCESSORY SYSTEM FOR VEHICLE, which are all hereby incorporated herein by reference.

Optionally, the imaging device and/or display device and/ or image processor may be positioned, for example, in or at or near an accessory module or windshield electronics module or console, such as the types described in U.S. patent applications Ser. No. 10/355,454, filed Jan. 31, 2003 by Schofield et al. for VEHICLE ACCESSORY MODULE, now U.S. Pat. No. 6,824,281; and Ser. No. 10/456,599, filed Jun. 6, 2003 by Weller et al. for INTERIOR REARVIEW MIRROR SYSTEM WITH COMPASS, now U.S. Pat. No. 7,004,593, and/or U.S. Pat. Nos. 6,690,268; 6,250,148; 6,341,523; 6,593,565; and 6,326,613, and/or in PCT Application No. PCT/US03/ 40611, filed Dec. 19, 2003 by Donnelly Corp. et al. for ACCESSORY SYSTEM FOR VEHICLE, which are hereby incorporated herein by reference). Optionally, the imaging device may be positioned elsewhere in or at the vehicle, such as at or in the headliner of the vehicle or elsewhere at or in the vehicle, without affecting the scope of the present invention.

Optionally, the accessory module may include other accessories or circuitry therein, or may be associated with other accessories or circuitry of the interior rearview mirror assembly and/or of the vehicle. For example, the accessory module or mirror assembly may be associated with a proximity sensing device or antenna positioned along the interior surface of the windshield. The sensing device may detect the presence of an object, such as a raindrop or water droplets, at the exterior surface of the windshield and, thus, may function as a rain sensing device or rain sensor for sensing precipitation at the exterior surface of the windshield. The proximity sensing device may be positioned at an area of the windshield that is swept by the windshield wiper to clean the area.

The sensing device or antenna may detect the presence of moisture or precipitation when rain drops or condensation or the like are within its range of detection, and may generate an output signal in response to such a detection. The control may process the signals received from the sensing device to determine if an object indicative of rain drops or precipitation is detected or sensed at the windshield. The control may then actuate the windshield wipers of the vehicle in response to such indication. Optionally, the sensing device may sense the presence of objects, such as moisture, at the interior surface of the windshield and the control may process the signals to determine if the detected object is indicative of moisture at the windshield surface.

The control may actuate or control a blower motor or a control setting of a heating, ventilation and air conditioning (HVAC) system of the vehicle to defog the windshield and/or may close a sunroof or window of the vehicle when the control detects moisture on the surface of the windshield, such as by utilizing aspects of the rain sensors described in U.S. Pat. Nos. 6,516,664; 6,320,176; 6,353,392; 6,313,454; 6,341,523; and 6,250,148; and/or in U.S. patent applications Ser. No. 10/355,454, filed Jan. 31, 2003 by Schofield et al. for VEHICLE ACCESSORY MODULE, now U.S. Pat. No. 6,824,281; and Ser. No. 10/348,514, filed Jan. 21, 2003 by Lynam for RAIN SENSOR MOUNTING SYSTEM, now U.S. Pat. No. 6,968,736, which are hereby incorporated herein by reference. The proximity sensor may utilize the principles described in U.S. Pat. No. 5,594,222; and/or U.S. patent applications Ser. No. 10/956,749, filed Oct. 1, 2004, now U.S. Pat. No. 7,446,924; and/or Ser. No. 10/933,842, filed Sep. 3, 2004, now U.S. Pat. No. 7,249,860; and/or PCT Application No. PCT/US03/40611, filed Dec. 19, 2003 by Donnelly Corp. et al. for ACCESSORY SYSTEM FOR VEHICLE, which are hereby incorporated herein by reference.

Optionally, the proximity sensor may comprise a substantially transparent antenna or substantially transparent metallized antenna or substantially transparent conductor, such as a wire or wires embedded in the windshield or a conductive coating (such as indium tin oxide (ITO) or the like) on a window or panel surface, such as the interior surface of the windshield. The proximity sensor of the present invention thus may provide or span or interrogate a larger sensing area without obstructing the field of view of the driver or occupant of the vehicle. Optionally, the proximity sensor may comprise multiple sensors or sensing elements or a multi-element sensing array or matrix that is operable to interrogate the windshield surface over a large area of the windshield. By interrogating a large area of the windshield, the rain sensing system of the present invention may sample multiple small segments of the whole sensing area. Such samplings may enhance the system's ability to discern between large raindrops on the windshield and small raindrops or mist on the windshield and other non-precipitation items, such as dirt or dust or the like, on the windshield.

Optionally, the antenna or proximity sensor or sensors or sensing elements may be incorporated into or attached to or associated with a windshield electronics module or accessory module positioned generally at or against the interior surface of the windshield. For example, the sensing element or elements may be attached to or positioned at or molded in the wall of the module that opposes and/or engages the interior surface of the windshield. The sensing element or elements may be electrically connected to rain sensor or control circuitry within the accessory module or elsewhere within the vehicle, such as at an interior rearview mirror assembly or overhead console or instrument panel of the vehicle.

Alternately, the sensing element or elements may be attached to the interior surface of the windshield, such as via an adhesive, such as via an adhesive tape such as a double sided adhesive tape or the like. The sensing element or elements thus may be positioned along the windshield surface without having to press the sensing element against the windshield surface to optically couple the sensing element to the windshield surface, as is often required in connection with many known rain sensing imaging devices.

The sensing element or elements of the present invention thus may be readily attached to the windshield surface, or may be formed on the windshield surface or may be embedded into the windshield, or may be incorporated into a windshield electronics module or accessory module at the windshield, without having to press the sensing element against the windshield surface. The sensing element or elements may be substantially transparent or not readily discernible by a driver or occupant of the vehicle, so that the sensing elements may cover and/or interrogate a large area of the windshield to provide enhanced sensing capabilities, without obstructing the field of view of the driver or occupant of the vehicle. The sensing element or elements may be implemented in conjunction with a rain sensor control that is operable to process signals from the sensing elements and to control a windshield wiper of the vehicle or a blower of the vehicle or an HVAC system of the vehicle or a defogger of the vehicle or a window or sunroof of the vehicle (such as to close the window or sunroof when rain is detected) or the like, in response to the signal processing.

Optionally, the accessory module and/or the interior rearview mirror assembly may include a forward facing braking indicator that is actuatable in response to a braking of the subject vehicle. The forward facing braking indicator may be viewable by a driver or occupant of a leading vehicle and may indicate to the driver or occupant of the leading vehicle that the subject vehicle approaching them is braking. The indicator may be in communication with a brake system of the vehicle, such as to a brake switch at the brake pedal or the like, and thus may indicate when the brakes are applied by the driver of the subject vehicle. The indicator may be operable in conjunction with the brake system and/or independently of the brake system (such as in response to a deceleration sensor or the like), and may utilize the principles described in U.S. Pat. Nos. 6,124,647; 6,291,906; and 6,411,204, which are hereby incorporated herein by reference.

The indicator thus alerts the other drivers or people in front of the subject vehicle that the vehicle is braking and, thus, may be highly useful at intersections with two, three or four way stops or the like. The indicator may be at or near or associated with an accessory module or windshield electronics module or console or interior rearview mirror assembly or the like of the vehicle and may be readily viewable and discernible by a person outside of and forwardly of the subject vehicle. The control may adjust or modulate the indicator to enhance the viewability or discernibility of the indicator, such as flashing or increasing the intensity of the indicator, such as in response to rapid or hard braking or the like of the subject vehicle or in response to a proximity or distance sensor detecting that the subject vehicle is within a threshold distance of another vehicle and/or is approaching the other vehicle at or above a threshold speed, such as described in U.S. Pat. Nos. 6,124,647; 6,291,906; and 6,411,204, which are hereby incorporated herein by reference.

Optionally, the imaging device may be associated with an accessory control system, such as a headlamp control system or the like. The imaging device may capture images of the field of view forwardly of the vehicle and the control may process the images and adjust a headlamp setting in response to such processing. Examples of such automatic headlamp control systems are described in U.S. Pat. Nos. 5,796,094; 6,097,023; and 6,559,435, and U.S. patent application Ser. No. 10/421,281, filed Apr. 23, 2003 by Schofield for AUTOMATIC HEADLAMP CONTROL, now U.S. Pat. No. 7,004,606.

Optionally, the headlamp control may adjust a direction of the headlamps in response to such image processing. For example, the control may process the captured images to identify headlamps of oncoming vehicles and/or taillights of leading vehicles and may adjust the downward angle of the headlamps in response to such identification. The headlamps may be adjusted based on the identification of the headlamps or taillights and a predetermined or learned knowledge of the location of headlamps or taillights on vehicles, in order to adjust the headlamps to a desired or appropriate downward angle.

Optionally, the headlamps may be adjusted to compensate for vehicle loading so that the headlamps are directed in a desired direction regardless of the forward pitch or angle of the vehicle. For example, a forward (or rearward) edge of the low headlamp beam in front of the vehicle (such as at the road surface in front of the vehicle) may be identified and, based on the location of the detected edge or distance to the detected edge, the control may determine the loading angle or pitch of the vehicle. The control may then raise or lower the headlamp angle accordingly, so that the headlamp angle is set to approximately the desired direction regardless of the pitch or angle of the vehicle.

Optionally, the control may be operable to process the captured images to determine undulations in the road on which the vehicle is traveling and may utilize the processed information to determine the angle of the vehicle and the valleys and peaks in the road. The control may then adjust the headlamp beam angle and/or direction according to the detected undulations in the road. The control may be operable in conjunction with a forward facing imaging device and/or a rearward facing imaging device and may be operable in conjunction with or may be incorporated in a lane change assist system or lane departure warning system or the like, such as the types described in U.S. Pat. Nos. 5,929,786 and/or 5,786,772, and/or U.S. patent applications Ser. No. 10/427,051, filed Apr. 30, 2003, now U.S. Pat. No. 7,038,577; and Ser. No. 10/209,173, filed Jul. 31, 2002, now U.S. Pat. No. 6,882,287, which are hereby incorporated herein by reference.

Optionally, the control may process the captured images to detect headlamps of oncoming vehicles and to steer or direct the headlamp beams at least partially away from the detected oncoming vehicle. For example, the control may determine that an oncoming vehicle is approaching the subject vehicle in a lane that is to the left of the subject vehicle, and may steer the headlamp beams inboard or to the right to limit or reduce directing the headlamps into the eyes of the driver of the oncoming vehicle. The control thus may steer the headlamp beams inboard (or may steer the outboard or left headlamp beam inboard while keeping the right or opposite headlamp beam at the initial direction) when oncoming traffic is detected to limit glare to the drivers of the oncoming vehicles. In situations where the oncoming traffic is located to the right of the subject vehicle, the control may steer the headlamp beams (or the right headlamp beam while keeping the left or opposite headlamp beam unchanged) inboard or to the left to limit the glare to the drivers of the oncoming vehicle or vehicles. The steering of the headlamp beam or beams may be done in conjunction with the switching of the beams to a low beam setting, or may be done independently of the high/low beam setting of the headlamps.

Optionally, the control may process the captured images and may control or adjust a louver or filter or the like to direct the headlamp beams in a desired or appropriate direction. For example, a louver or baffle or slats or the like may be positioned in front of the headlamps, and the slats of the louver may be angled and adjusted to adjust the amount of light that passes through the louver. The louver slats thus may adjusted to an increased angle, such as a downward angle, relative to the headlamps to reduce the amount of light that passes through the louver (and thus that is visible in front of the vehicle) and thus to reduce the range of the headlamps. The louver control thus controls or adjusts the visible intensity and range of the headlamps, and may be operable to do this in response to a detection of oncoming traffic or a detection of leading traffic or any other input or detection, without affecting the scope of the present invention.

Optionally, the control may be operable to process the captured images to detect objects in front of the vehicle or forwardly of the vehicle and may control or adjust the display to indicate that an object is detected. For example, and particularly during nighttime driving conditions, the control may process the captured images captured by the forward facing imaging device to detect objects of interest that are in the forward field of view of the imaging device. The imaging device may utilize night vision principles, and may be operable in connection with an auxiliary light source or infrared radiation source to enhance the night vision capabilities of the imaging device. When an object of interest is detected, the control may process the image to extract the object data and may determine a distance to and location of the detected object relative to the vehicle and the projected path of the vehicle to further determine if the object is a threat to the subject vehicle, such as an animal moving toward or standing in the road ahead of the vehicle but not yet viewable/discernible to the driver of the vehicle.

If the detected object is also determined to be a threat or danger to the vehicle, such as a deer at the side of the road or on the road ahead of the vehicle but not yet viewable/discernible by the driver of the vehicle, the control may adjust or actuate or control a display device or element to display the detected object to the driver or may otherwise alert the driver of the potentially hazardous condition ahead. Optionally, the control may extract the object data or image data of the object (without the image data of the rest of the captured image) and may present the object image to the driver, or may identify the object and present an icon or indicia or message that indicates to the driver what the particular detected object is that is ahead of the vehicle. The control may control a display at the interior rearview mirror assembly or at an accessory module or the like, or may control a heads up display (HUD) that is operable to display the object or indicia in front of the driver and in the driver's field of view, so that the driver is aware of the detected object. Preferably, the control may display only the detected object (such as an image of a detected deer that is extracted from the captured image) at a location in the driver's field of view that generally or substantially corresponds to the location at which the object is actually positioned in front of the vehicle. Because the other image data is not projected or displayed, the driver is only notified of or alerted to the particular detected object or objects which the control determines present a hazardous condition (such as in response to the size of the object, the location of the object, the speed of the vehicle and/or the object, the direction of travel of the vehicle and/or the object, and/or the like).

In order to properly position the image of the object in the driver's field of view, such as via a heads up display, the control may also be operable in conjunction with an occupant detection system or cabin imaging system or the like that is operable to detect and determine the head position of the driver of the vehicle. The cabin imaging system thus may detect the head position of the driver, and the control may determine the appropriate location for the object image in the heads up display in accordance with the driver's head position.

Optionally, the control may be operable in conjunction with or may be incorporated into a lane departure warning system or the like, and may detect and identify lane markers along the road lane in front of the vehicle. The imaging device may be operable to detect or capture images of the lane markers in situations where the driver may not readily do so, such as in darkened or nighttime conditions or when there is glare on the road surface. The control may identify the lane markers in the captured images and may extract (via image processing) the lane marker data from the captured images or captured image data, and may project the lane marker images via a heads up display so that the driver may view the lane markers in the heads up display, where the lane marker image in the heads up display in the driver's field of view substantially corresponds to the actual location of the lane markers on the road surface.

In order to properly position the image of the lane markers in the driver's field of view, the control may be operable in conjunction with an occupant detection system or cabin imaging system as described above to determine the driver's head location. It is further envisioned that the control may adjust the display of the lane markers to indicate a lane drift or departure by the vehicle. For example, the lane marker images may be flashed or enhanced, such as by increasing the intensity or changing the color of the lane marker images, when such a lane drift is detected. The driver of the vehicle thus may be alerted to a lane change or drift or departure by adjusting the heads up display of the lane markers to draw the driver's attention to the lane markers without providing other unnecessary information to the driver. The lane departure warning system may utilize the principles described in U.S. Pat. Nos. 5,929,786 and/or 5,786,772, and/or U.S. patent applications Ser. No. 10/427,051, filed Apr. 30, 2003, now U.S. Pat. No. 7,038,577; and Ser. No. 10/209,173, filed Jul. 31, 2002, now U.S. Pat. No. 6,882,287; and/or U.S. provisional application Ser. No. 60/638,687, filed Dec. 23, 2004 by Higgins-Luthman for OBJECT DETECTION SYSTEM FOR VEHICLE, which are hereby incorporated herein by reference.

Figure 6:
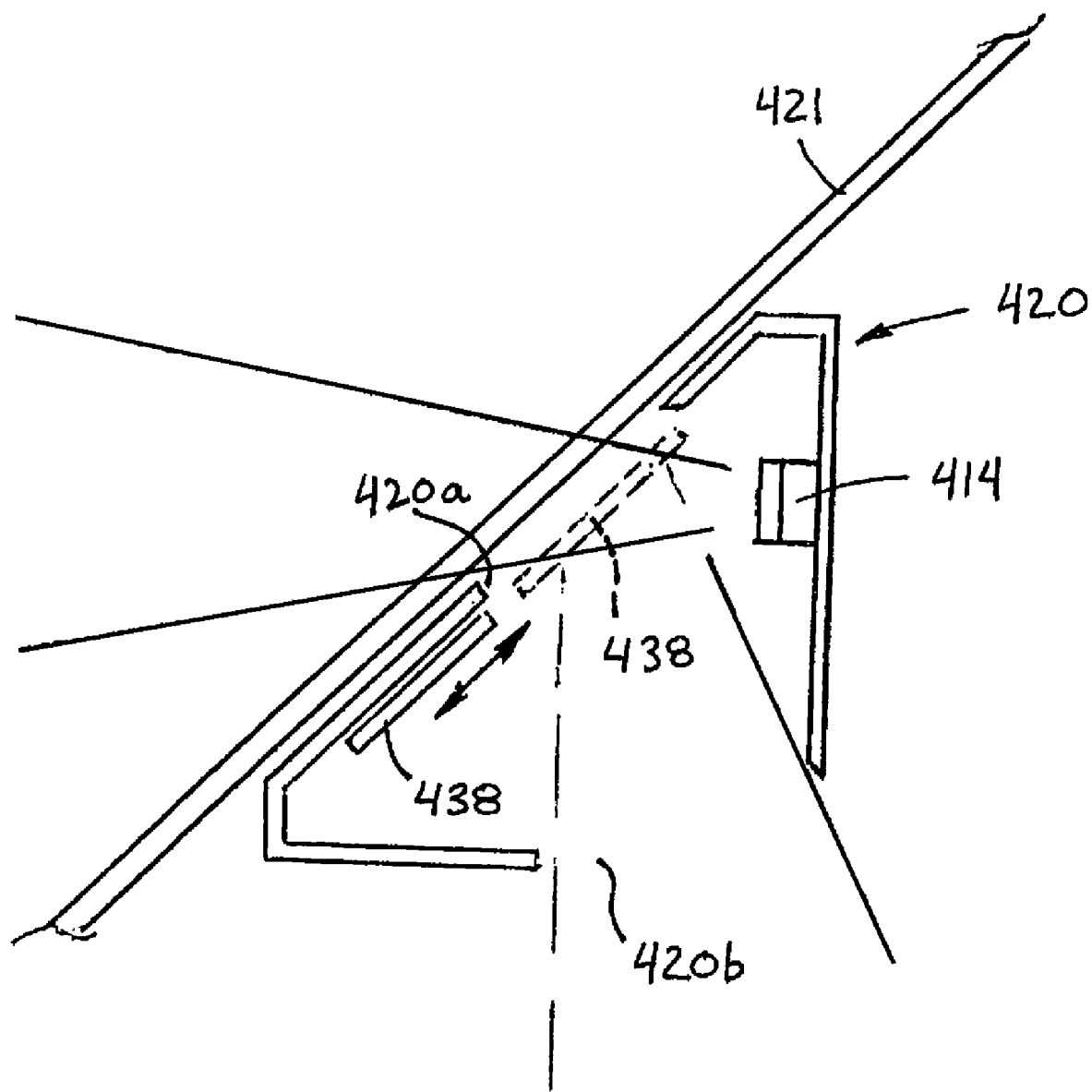
FIG. 6 is a sectional view of an accessory module having an imaging device in accordance with the present invention.

Optionally, the imaging device may be selectively operable to provide a forward facing field of view and a rearward facing field of view or cabin viewing field of view. For example, and with reference to FIG. 6, a forward facing imaging device 414 may be positioned within an accessory module or pod 420 and may be directed generally forwardly to provide a forward field of view through the windshield 421 of the vehicle. The accessory module 420 may include a movable reflector 438 that may be selectively moved relative to the imaging device 414, such as along the windshield and in front of the imaging device as shown in FIG. 6, to reflect an image of the cabin of the vehicle to the imaging plane or array of the imaging device. The accessory module may include a window or opening 420a at the windshield or toward the windshield for receiving images of the scene forwardly of the vehicle therethrough, and may also include a window or opening 420b along a lower or rearward side or portion of the module for receiving images of the scene occurring within the vehicle cabin therethrough. Although shown in FIG. 6 as reflecting an image from generally below the module to the imaging device, clearly, the angle of the movable reflector may be adjusted or selected to provide a more rearwardly directed field of view, depending on the application of the imaging system. For example, the angle may be selected to provide a generally rearward field of view for use with a backup aid or rear vision system, or the angle may be selected to reflect images from one side of the module, such as for use with an occupant detection system or a head position detection system or the like.

The movable reflector 438 may be selectively moved between a removed position (as shown in FIG. 6), where the imaging device has a forward field of view and is operable to capture images of the scene occurring forwardly of the vehicle (such as for headlamp control, rain sensing, object detection and the like), and a reflecting position (as shown in phantom in FIG. 6), where the imaging device receives the reflected image of a rearward view or of the cabin of the vehicle (such as for a backup aid or reverse imaging system or a cabin monitoring system or head position sensing system or the like). The movable reflector may be slidably moved along a portion of the accessory module or may be pivoted or otherwise moved between the removed position and reflecting position. The movable reflector may be moved between the positions automatically, such as in response to activation of a forward imaging system or a cabin imaging system or a backup aid, or may switch between the positions to provide the desired or appropriate head location data for use in conjunction with a forward imaging system and display, such as described above. Alternately, it is envisioned that the imaging device may be selectively movable to be directed forwardly through the windshield or toward a stationary reflector for capturing images of the cabin or rearward of the mirror assembly or accessory module, without affecting the scope of the present invention.

Optionally, the imaging system may be operable to determine the temperature at the imaging device, in order to determine or approximate the operating temperature of the imaging device. Although it is known to monitor the operating temperature of an imaging device in order to manage or allow for thermal shutdown of the imaging device to avoid overheating of the device, such systems or devices typically include separate temperature sensors positioned at or nearby the imaging sensor to determine the surrounding temperature. According to an aspect of the present invention, the imaging device, which comprises an imaging array having an array of photo-sensing pixels, may be operable to approximate the operating temperature based on the dark current of some of the pixels of the imaging array. More particularly, one or more pixels of the imaging array may be masked so that little or no light reaches the pixel. Because the changes in dark current (the current through the pixel when no light is received by the pixel) is generally proportionate to the changes in temperature of the pixel, a measurement of the dark current, in conjunction with a precalculation and/or relationship of the dark current and temperature, may provide an indication or approximation of the temperature at the pixelated array.

The control of the imaging system thus may be operable to shut down the imaging array sensor or shut down other electronic components of the control system or imaging system in response to the calculated or approximated or estimated temperature being greater than a predetermined threshold that is indicative of a temperature threshold for safe or effective operation of the imaging device and system. Optionally, the control may be operable to correct or adjust the sensor or system in response to detection or calculation of a threshold temperature, in order to correct or compensate for the increased temperature at the imaging sensor to enhance the performance of the imaging system or control system.

Optionally, the accessory module and/or interior rearview mirror assembly or system of the vehicle may include a hands free phone system, and thus may include the interface driver, microphone or microphones, user inputs, speech recognition system and/or the like. An example of such a system is described in PCT Application No. PCT/US03/40611, filed Dec. 19, 2003 by Donnelly Corp. et al. for ACCESSORY SYSTEM FOR VEHICLE, which is hereby incorporated herein by reference. The audio signal from the system of the module or mirror assembly is preferably linked to the radio head, such as to a plug or connector at the radio head that accepts external audio signals and mute signals. The system thus may mute the audio and effectively take over the speakers when the phone is in use. This connection to the vehicle audio or radio or speaker system may utilize a communication link, such as a BLUETOOTH® communication protocol or link or the like. The signals from the mobile or cellular phone to the mirror assembly or accessory module may be communicated via a BLUETOOTH® link, while the signals from the mirror assembly or accessory module to the radio head may also be communicated via a BLUETOOTH® link. The mirror assembly or accessory module may also include a display, such as a transflective or display on demand display, to display at least some of the phone information, such as the number dialed, the incoming number, the status of the call, strength of signal, phone book, messages, and/or the like. Although described as utilizing a BLUETOOTH® communication link or protocol, other communication protocols or links may be implemented, such as other short/restricted range radio frequency (RF) or infrared (a) communication protocol or link.

Optionally, a communication link between an accessory module or windshield electronics module and the interior rearview mirror assembly may be provided wirelessly and/or along and/or through the mounting arm of the mirror assembly. For example (and as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference), the communication link may be via an infrared transmitter and receiver at the respective module and mirror assembly. Optionally (and as described in U.S. patent application Ser. No. 10/964,512, filed Oct. 13, 2004 by Schofield et al. for VEHICLE COMMUNICATION SYSTEM, now U.S. Pat. No. 7,308,341, which is hereby incorporated herein by reference), the communication link may be a two way link with the signals being communicated along the same wiring. Optionally, the mounting arm of the mounting assembly may include a passageway therethrough for routing an accessory wiring or the like through the arm to provide electrical communication between the circuitry or accessory of the mirror assembly and the circuitry or accessories or power source of the accessory module or of the vehicle. For example, the mounting assembly may utilize principles described in U.S. patent application Ser. No. 10/032,401, filed Dec. 20, 2001, now U.S. Pat. Publication No. US2002/0088916A1, published Jul. 11, 2002, now U.S. Pat. No. 6,877,709; and/or U.S. patent application Ser. No. 10/933,842, filed Sep. 3, 2004, now U.S. Pat. No. 7,249,860; and/or PCT Application No. PCT/US2004/015424, filed May 18, 2004 by Donnelly Corp. et al. for MIRROR ASSEMBLY FOR VEHICLE; and/or U.S. provisional applications Ser. No. 60/653,787, filed Feb. 17, 2005 by Karner et al. for MOUNTING ASSEMBLY FOR MIRROR AND METHOD OF MAKING SAME; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference, or may utilize electrical connection principles of the type described in International Publication No. WO 2003/095269 A3, published Nov. 20, 2003 for REARVIEW MIR- ROR ASSEMBLIES, which is hereby incorporated herein by reference. Optionally, the mounting arm passageway may allow for infrared or visible light to be transmitted along the tube or arm to communicate signals to or from the mirror assembly. In such applications, the arm or mounting assembly may include reflectors or mirrored surfaces to guide and reflect the light between the source and receiver, and may adjust the reflectors to accommodate adjustment of the mirror head assembly relative to the mounting base. The mounting arm thus may provide a light conduit or path or pipe for light signals to be communicated or guided or directed to provide communication between the accessory module or pod and the interior rearview mirror assembly. Other means for providing electrical power and/or control to the circuitry and/or accessories of the mirror assembly may be implemented without affecting the scope of the present invention.

Optionally, the vehicle or the rearview mirror assembly or accessory module of the vehicle may include a communication system or interface system that is operable to communicate with a remote or external control or base or center of a telematic system, such as ONSTAR®, TELEAID™, RESCU® or the like, or with any other remote computerized server or database or information provider or the like. The data captured by an imaging device of the vehicle (such as a rearward facing imaging device or a cabin monitoring imaging device or a forward facing imaging device or another vehicle-based imaging device or camera) may be communicated to the communication system (the communication system may be at the camera device or the signals may be communicated to the communication system remote from the camera, such as via vehicle wiring or via a local wireless communication or the like), whereby the communication system may communicate the image data to the external control of the telematic system. The image data may be processed by the processor at the external control and a signal indicative of such image processing may be communicated from the external control to the communication system of the vehicle, where the appropriate information may be displayed or otherwise communicated or conveyed to the driver or occupant of the vehicle.

In some known imaging systems for vehicles, image data is communicated from the vehicle camera to a microprocessor in the vehicle where the image data is processed. Such a system typically requires connection of the camera and microprocessor and display or alert device via wires or local wireless connections and requires in vehicle processing and connections. Such a system is typically not conducive for sharing information gathered from the image processing with other systems or devices or vehicles.

The communication system of the present invention receives the image data and uploads the image data to the external control for processing. Optionally, the vehicle communication system may conduct a data compression routine to compress the image data prior to uploading the data to the external control. For example, the vehicle communication system may compress the data and upload the compressed data using "burst" technology (where compressed data are transmitted or communicated to a satellite or the like in short (such as, for example, about twelve milliseconds or thereabouts) signals or bursts) to convey large amounts of data to the external control. The external control may then process the image data and extract the desired or relevant information from the image data and may communicate a signal back to the vehicle that is indicative of the extracted information.

The communication system and telematic system of the present invention thus may harness the processing power of the external control, which may be substantially greater than the processing power of a vehicle-based microprocessor. The external control may receive the image data and may recognize that the data is being communicated from a particular vehicle. In applications where the vehicle includes a global positioning system (GPS), the external control may receive and process the image data and may receive an input that is indicative of the vehicle location. The external control thus may process the image data and location data to extract information and provide an output that may be relevant to the location of the vehicle. For example, the external control may process the image data and may determine the speed limit signage information in the appropriate units based on the vehicle location, such as described above.

The external control may also receive location data from other vehicles and thus may know the location of other vehicles relative to the subject vehicle. For example, if the vehicle-based imaging device is for an adaptive cruise control system, the external control may receive the forward viewing image data and may receive data indicative of the vehicle location. The external control may also receive location data from other vehicles and thus may know the relative location and movements of other vehicles. If, for example, the subject vehicle is approaching a curve in the road and another vehicle is approaching in the opposite direction from around the curve, the external control may communicate a signal to the subject vehicle that is indicative of the location of the other vehicle. For example, the external control may provide a signal to the vehicle whereby an alert or warning or display device of the vehicle operates to alert or warn the driver of the subject vehicle as to the location of the approaching vehicle, in order to reduce or avoid vehicle collisions.

Optionally, the imaging system of the vehicle may be associated with an adaptive front lighting (AFL) system. The imaging system may also be associated with a lane departure warning system or side object detection system or lane change assist system or the like. The imaging device of the imaging system may be a forward facing imaging device or camera that is operable to capture images of a forward field of view. The control or microprocessor (or external control of a telematic system or the like) may process the image data to identify lane markers and other objects of interest in the forward field of view, such as by utilizing the principles described in U.S. Pat. No. 5,929,786, and/or U.S. patent applications Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 10/209,173, filed Jul. 31, 2002 by Schofield for AUTOMOTIVE LANE CHANGE AID, now U.S. Pat. No. 6,882,287, and/or U.S. provisional application Ser. No. 60/638,687, filed Dec. 23, 2004 by Higgins-Luthman for OBJECT DETECTION SYSTEM FOR VEHICLE, which are hereby incorporated herein by reference.

For example, the lane departure warning system may process the image data to detect the lane markers along the road surface in front of the vehicle. The lane departure warning system may detect a curvature in the road as the lane markers (or other characteristics, such as a curb or shoulder of the road) curve in front of the vehicle (such as by utilizing principles described in U.S. provisional application Ser. No. 60/638,687, filed Dec. 23, 2004 by Higgins-Luthman for OBJECT DETECTION SYSTEM FOR VEHICLE, which is hereby incorporated herein by reference). Such road curvature information extracted from the image data may be used as an input or feed signal to the headlamp control system, which may adjust or control the headlamps to direct the headlamp beam toward one side or the other of the vehicle, in order to generally follow the curve of the road in front of the vehicle and, thus, to generally follow the anticipated path of the vehicle.

Typically, a lane departure warning system is interested in and may principally monitor the near field of view of the imaging device, such as, for example, about ten to twenty feet in front of the vehicle, while an intelligent headlamp control system and/or an adaptive front lighting system may principally monitor a further or far field of view of the imaging device. The processor thus may process different areas of the captured image data for the different applications. For example, the processor may process the captured image data in a frame-by-frame manner, and may process different areas of the image to extract different information for some of the frames (such as by utilizing the principles described in U.S. provisional applications Ser. No. 60/630,061, filed Nov. 22, 2004 by Lynam et al. for MIRROR ASSEMBLY WITH VIDEO DISPLAY; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, which are hereby incorporated herein by reference).

Thus, if the imaging device captures frames at a rate of about thirty frames per second (or other frame rate depending on the particular application and system capabilities and the like), the processor may process different frames for different functions or systems or the processor may selectively process a given frame or frames for more than one functionality or feature. For example, every third frame may be processed for the lane departure warning system, while every fifth frame may be processed for the adaptive front lighting system, while every second frame may be processed for the intelligent headlamp control system. Alternatively, any one frame or sets of frames may be processed for intelligent headlamp control only, while other frames or sets of frames may be processed for lane departure warning and/or adaptive front lighting. The microprocessor thus may process different portions or areas of the image data for different functions or systems of the vehicle. The less relevant image data from the particular sets of frames thus may be processed less by the microprocessor so that the microprocessor has reduced or focused processing of the image data sets that is focused on the particular area of the image data that is relevant to the particular system or function for that particular frame or set of frames. Optionally, different processors may process the image data or may process different frames of image data captured by the imaging device or camera. Optionally, the reduced processed frame data may accumulate over several frames to provide a history and/or content/background for a given functionality, such as for an adaptive front lighting system.

Thus, a single camera and optical system can provide at least triple functionality, such as intelligent headlamp control, lane departure warning, and adaptive front lighting. For example, the image data captured by a single forward facing camera and associated lens and optical system can be processed and the information extracted can be used to control the headlamps on/off or high beam/low beam settings, to detect and monitor lane markers, and to provide an input or feed to a headlamp controller that may adjust or redirect the headlamp beam for an adaptive front lighting system.

Desirably, the system may intelligently process the image data and harness the processing power and frame rate to provide enhanced dynamic processing of image data depending on the particular lighting conditions. For example, the system may bias the processing toward extracting information from the image data for the headlamp control when the ambient lighting conditions are reduced, such as at nighttime, and may bias the processing toward extracting information from the image data for the lane departure warning system when the ambient lighting conditions are increased, such as during daytime or other conditions when it is less likely that headlamp control is needed. The processor or imaging system thus provides dynamic processing of the captured image data to enhance the performance of the associated headlamp control function, adaptive front lighting function and lane departure warning function.

Optionally, a rearview mirror and/or accessory module or windshield electronics module of a vehicle may include or may be associated with a storage medium for storing digital data or the like. For example, the mirror or module may include circuitry or accessories to record data (such as music from an iPod or MP3 player or the like) to a memory card and/or disc or other storage medium, such as a mini hard drive, or the like. For example, the rearview mirror assembly or accessory module may include a hard disc drive (HDD) electronic mass storage device, such as a HDD microdrive, such as a one-inch (or smaller) HDD, such as the types developed by Hitachi Global Storage Technologies, Inc. (HGST) of the United States, Hoya Corp. of Japan, and Seagate Technology LLC, and such as described in U.S. patent application Ser. No. 10/933,842, filed Sep. 3, 2004, now U.S. Pat. No. 7,249,860, which is hereby incorporated herein by reference. The data that is stored in the storage medium may then be "played" by the system and streamed through the speakers of the vehicle to play the music or playback the recording or the like that is stored in the storage medium. Optionally, the memory or storage medium may be removed from the mirror or accessory module and plugged into or connected to the iPod or MP3 player or the like (and vice versa), in order to playback the music or information stored on the storage medium with the different playback devices.

Optionally, the driver or other occupant of the vehicle may bring his or her digital audio player (such as an iPod or similar MP3 or other device) and dock at an interior mirror location (such as at a video slide-out mirror) or at a windshield electronics module (WEM) location (such as is disclosed, for example, in U.S. Pat. Nos. 6,428,172; 6,501,387; and 6,329,925, which are hereby incorporated herein by reference). Information relating to the audio device (such as track number or song title or index or the like) may be displayed at the interior mirror assembly (such as using display-on-demand transflective mirror reflector technology as described herein), or may be displayed on a video slide-out mirror screen (such as disclosed in PCT Application No. PCT/US03/40611, filed Dec. 19, 2003 by Donnelly Corp. et al. for ACCESSORY SYSTEM FOR VEHICLE, and/or U.S. provisional application Ser. No. 60/630,061, filed Nov. 22, 2004 by Lynam et al. for MIRROR ASSEMBLY WITH VIDEO DISPLAY, which are hereby incorporated herein by reference) or may be displayed at a WEM. Also, controls to operate the consumer portable device, such as an iPod or the like, may be included at the interior mirror assembly and/or at a WEM. While docking has the added advantage of providing electrical current from the vehicle battery/ignition system to recharge the portable device, such as an iPod or similar MP3 player, the iPod device optionally need not dock and can be in wireless communication with the interior mirror and/or WEM via a short range wireless communication protocol, such as BLUETOOTH® or the like. Of course, if desired, wired connection can also be used.

Optionally, a docking station can be provided other than at the interior mirror or WEM. For example, an iPod or a similar audio device or a video playback device (such as a DVD player) can dock at a docking cradle located between the front seats and can be in wireless communication (such as via BLUETOOTH®) and/or optionally can be in wired communication with the interior mirror and/or WEM, where the aforementioned displays and/or controls may be readily available to the driver or other occupant of the vehicle. The music or other audio or data files stored on the iPod or similar MP3 player or data storage device may be played via the audio system of the vehicle, and the driver or other front seat occupant can readily access the displays/controls at the interior mirror or WEM location.

Optionally, the data may be automatically recorded and stored on the storage medium incorporated into an interior mirror assembly and/or a WEM and/or an exterior mirror assembly or may be selectively stored on the storage medium. For example, a user may connect or plug in their iPod or MP3 player or cellular telephone or portable telephone or the like into a receiver or socket (such as at an interior mirror or at a WEM) and the data may be transferred or streamed onto the storage medium of that vehicular location so that the recording may be played back through the vehicle speakers of the vehicle audio system. Optionally, the data transfer may be accomplished wirelessly, such as via an IR and/or an RF wireless link. Optionally, the user may selectively record information or music from radio signals (such as signals broadcast to an AM/FM radio of the vehicle or to an XM satellite radio or the like), or the user may selectively record information or music from wireless INTERNET signals or the like (such as from a music download website or the like) where the transmitted or broadcast information may be transferred or streamed to the storage medium or disc or the like of the mirror assembly or accessory module of the vehicle. Optionally, the stored data or information or music may be transferred or streamed from the storage medium of the mirror or WEM to a portable device, such as an iPod or MP3 player or cellular telephone or portable telephone or the like for playback at a different time and remote from the vehicle.

Optionally, the recording or playback system of the vehicle may be voice activated, such that a user may provide a voice command to record or playback a particular track. For example, a user may select a specific track or tracks stored on a storage medium (such as the storage medium of the mirror or accessory module or the like or a storage medium of an MP3 player or iPod device or the like), and the track or tracks may be played accordingly. The system of the present invention thus may provide for voice activation of an MP3 player, such as via, preferably, a microphone or microphones located at the interior mirror assembly or at a WEM or the like, when the player is plugged into or connected to or in communication with the recording and/or playback system of the present invention.

It is further envisioned that the recording and/or playback system of the present invention may provide delayed playback of a recording that is made generally at the same time that it is being played back. For example, it may be desirable to remove commercial content from a radio (such as satellite radio or XM radio) transmission, since some satellite radio transmissions or broadcasts or signals or outputs now may include commercial content. If desired, the recording and/or playback system of the present invention could selectively record a transmission and begin playing the transmission back with a time delay. While the system plays the delayed output, the system may identify and remove commercial content (or other undesirable content) and continue playing the output without interruption. The user thus may select a record and play mode and hear substantially continuous output without the commercial content or otherwise undesired content.

Although shown and described as being positioned so as to have a forward field of view, it is also envisioned that the imaging device may be directed to have a field of view generally rearwardly or sidewardly of the vehicle to capture images of a rearward or sideward scene, without affecting the scope of the present invention. For example, the imaging device may be positioned at a rearward portion of the vehicle and/or may be used in connection with a rear vision system or the like, such as the types described in U.S. Pat. Nos. 5,550,677; 5,760,962; 5,670,935; 6,201,642; and/or 6,717,610, and/or in U.S. patent applications Ser. No. 10/010,862, filed Dec. 6, 2001 by Bos for PLASTIC LENS SYSTEM FOR VEHICLE IMAGING SYSTEM, now U.S. Pat. No. 6,757,109; Ser. No. 10/418,486, filed Apr. 18, 2003 by McMahon et al. for VEHICLE IMAGING SYSTEM, now U.S. Pat. No. 7,005,974, which are hereby incorporated herein by reference.

Optionally, the imaging device may be positioned at or near or at least partially within a door handle of a side door of the vehicle. The imaging device thus may provide a sideward field of view, such as for a side object detection system or lane change assist system or for a security system or the like.

The imaging device of the imaging system of the present invention thus is operable to capture multiple images or frames of the scene as the vehicle travels along the road, and may detect and recognize various street and/or traffic signs via processing of the captured images. If a detected sign is determined to be a speed limit sign or other traffic control sign of interest (such as a warning sign or the like), the imaging system may be operable to further process the images to determine or recognize the speed limit numbers on a speed limit sign and to provide an alert or warning signal to the driver of the vehicle if the vehicle exceeds the posted and recognized speed limit by a predetermined amount. The imaging system may have an interface (such as a user actuatable input or button, a voice receiver, a touch screen and/or the like) that would set a personal threshold for over-speed warning. The imaging device and/or imaging system may be multi-tasking and, thus, may be operable to detect headlamps and taillights and/or precipitation and/or objects and/or the like for or in connection with other accessories or systems, such as a headlamp control system, a precipitation sensor system, an adaptive speed control system, a lane departure warning system, a traffic lane control system and/or the like.

Changes and modifications in the specifically described embodiments can be carried out without departing from the principles of the present invention, which is intended to be limited only by the scope of the appended claims as interpreted according to the principles of patent law.

What is claimed is:

1. A driver assistance system for a vehicle, said driver assistance system comprising:

an imaging device having a field of view forward of a vehicle equipped with said driver assistance system and in a direction of travel of the equipped vehicle, wherein said imaging device is operable to capture image data;

an image processor operable to process image data captured by said imaging device;

a global positioning system operable to determine a geographical location of the equipped vehicle;

wherein the equipped vehicle comprises an adaptive speed control system for controlling the speed of the equipped vehicle;

wherein said adaptive speed control system reduces the speed of the equipped vehicle responsive at least in part to a detection of a curve in the road ahead of the equipped vehicle via processing by said image processor of image data captured by said imaging device;

wherein said adaptive speed control system reduces the speed of the equipped vehicle to a reduced speed for traveling around the detected curve in the road; and wherein said adaptive speed control system increases the speed of the equipped vehicle to above the reduced speed when the equipped vehicle is traveling along a straighter section of road after the curve in the road.

2. The driver assistance system of claim 1, wherein the speed reduction is determined at least in part responsive to at least one of (a) processing by said image processor of image data captured by said imaging device of a warning sign and (b) the current geographical location of the equipped vehicle as determined by said global positioning system.

3. The driver assistance system of claim 2, wherein the speed reduction is determined at least in part responsive to processing by said image processor of image data captured by said imaging device of a warning sign, and wherein said processing of captured image data by said image processor comprises at least one of (i) recognition of a warning sign and (ii) recognition of a warning sign and character recognition of characters on the recognized warning sign.

4. The driver assistance system of claim 1, wherein the speed reduction is determined at least in part responsive to (a) processing by said image processor of image data captured by said imaging device of a warning sign and (b) the current geographical location of the equipped vehicle as determined by said global positioning system.

5. The driver assistance system of claim 1, wherein said adaptive speed control system is operable to control the speed of the equipped vehicle responsive at least in part to the current geographical location of the equipped vehicle as determined by said global positioning system.

6. The driver assistance system of claim 1, wherein said adaptive speed control system reduces the speed of the equipped vehicle responsive at least in part to processing by said image processor of image data captured by said imaging device of a warning sign for a curve in the road ahead of the equipped vehicle.

7. The driver assistance system of claim 6, wherein said adaptive speed control system reduces the speed of the equipped vehicle to be below or generally at the speed level indicated on the warning sign.

8. The driver assistance system of claim 7, wherein the speed of the equipped vehicle increases to above the speed level indicated on the warning sign when the equipped vehicle is traveling along a straighter section of road after the curve in the road.

9. The driver assistance system of claim 8, wherein said adaptive speed control system comprises a cruise control system and wherein the speed of the equipped vehicle increases to a cruise control speed setting.

10. The driver assistance system of claim 1, wherein said adaptive speed control system comprises a cruise control system and wherein said adaptive speed control system reduces the speed of the equipped vehicle without deactivation of said cruise control system.

11. The driver assistance system of claim 1, wherein said adaptive speed control system comprises a cruise control system and wherein said adaptive speed control system reduces the speed of the equipped vehicle without driver deactivation of said cruise control system.

12. The driver assistance system of claim 1, wherein said driver assistance system generates an alert when the speed of the equipped vehicle exceeds a threshold amount.

13. The driver assistance system of claim 12, wherein said alert comprises one of (i) a change in intensity of displayed information, (ii) a flashing of displayed information, (iii) a change in color of displayed information, (iv) highlighting of displayed information, (v) an audible alert, (vi) a tactile alert and (vii) a haptic alert.

14. The driver assistance system of claim 1, wherein said driver assistance system is operable to determine a speed limit for the road along which the equipped vehicle is traveling based at least in part on (a) processing by said image processor of image data captured by said imaging device and (b) the current geographical location of the equipped vehicle as determined by said global positioning system.

15. The driver assistance system of claim 14, wherein said driver assistance system determines a difference between the current speed of the equipped vehicle and the speed limit for the road along which equipped vehicle is traveling.

16. A driver assistance system for a vehicle, said driver assistance system comprising: an imaging device having a field of view forward of a vehicle equipped with said driver assistance system and in a direction of travel of the equipped vehicle, wherein said imaging device is operable to capture image data;

an image processor operable to process image data captured by said imaging device;

a global positioning system operable to determine a geographical location of the equipped vehicle;

wherein the equipped vehicle comprises an adaptive speed control system for controlling the speed of the equipped vehicle;

wherein said adaptive speed control system is operable to control the speed of the equipped vehicle responsive at least in part to the current geographical location of the equipped vehicle as determined by said global positioning system;

wherein said adaptive speed control system reduces the speed of the equipped vehicle responsive at least in part to a detection of a curve in the road ahead of the equipped vehicle via processing by said image processor of image data captured by said imaging device;

wherein said adaptive speed control system reduces the speed of the equipped vehicle to a reduced speed for traveling around the detected curve in the road; and wherein said adaptive speed control system increases the speed of the equipped vehicle to above the reduced speed when the equipped vehicle is traveling along a straighter section of road after the curve in the road.

17. The driver assistance system of claim 16, wherein the reduced speed is determined at least in part responsive to the current geographical location of the equipped vehicle as determined by said global positioning system.

18. The driver assistance system of claim 16, wherein the reduced speed is determined at least in part responsive to at least one of (a) processing by said image processor of image data captured by said imaging device of a warning sign and (b) the current geographical location of the equipped vehicle as determined by said global positioning system.

19. The driver assistance system of claim 18, wherein the reduced speed is determined at least in part responsive to processing by said image processor of image data captured by said imaging device of a warning sign, and wherein said processing of captured image data by said image processor comprises at least one of (i) recognition of a warning sign and (ii) recognition of a warning sign and character recognition of characters on the recognized warning sign.

20. The driver assistance system of claim 18, wherein the reduced speed is determined at least in part responsive to (a)

processing by said image processor of image data captured by said imaging device of a warning sign and (b) the current geographical location of the equipped vehicle as determined by said global positioning system.

21. The driver assistance system of claim 16, wherein said adaptive speed control system comprises a cruise control system and wherein said adaptive speed control system reduces the speed of the equipped vehicle to a reduced speed for traveling around the detected curve in the road without deactivation of said cruise control system.

22. A driver assistance system for a vehicle, said driver assistance system comprising:
  an imaging device having a field of view forward of a vehicle equipped with said driver assistance system and in a direction of travel of the equipped vehicle, wherein said imaging device is operable to capture image data;
  an image processor operable to process image data captured by said imaging device;
  a global positioning system operable to determine a geographical location of the equipped vehicle;
  wherein the equipped vehicle comprises an adaptive speed control system for controlling the speed of the equipped vehicle;
  wherein said adaptive speed control system is operable to control the speed of the equipped vehicle responsive at least in part to the current geographical location of the equipped vehicle as determined by said global positioning system;
  wherein said adaptive speed control system reduces the speed of the equipped vehicle responsive at least in part to a detection of a curve in the road ahead of the equipped vehicle via processing by said image processor of image data captured by said imaging device;
  wherein said adaptive speed control system reduces the speed of the equipped vehicle to a reduced speed for traveling around the detected curve in the road;
  wherein the reduced speed is determined at least in part responsive to at least one of (a) processing by said image processor of image data captured by said imaging device of a warning sign and (b) the current geographical location of the equipped vehicle as determined by said global positioning system; and
  wherein said adaptive speed control system reduces the speed of the equipped vehicle responsive at least in part to processing by said image processor of image data captured by said imaging device of a warning sign for a curve in the road ahead of the equipped vehicle, and wherein said adaptive speed control system reduces the speed of the equipped vehicle to be below or generally at the speed level indicated on the warning sign, and wherein the speed of the equipped vehicle increases to above the speed level indicated on the warning sign when the equipped vehicle is traveling along a straighter section of road after the curve in the road, and wherein said adaptive speed control system comprises a cruise control system and wherein the speed of the equipped vehicle increases to a cruise control speed setting.

23. A driver assistance system for a vehicle, said driver assistance system comprising:
  an imaging device having a field of view forward of a vehicle equipped with said driver assistance system and in a direction of travel of the equipped vehicle, wherein said, imaging device is operable to capture image data;
  an image processor operable to process image data captured by said imaging device;
  a global positioning system operable to determine a geographical location of the equipped vehicle;
  wherein the equipped vehicle comprises an adaptive speed control system for controlling the speed of the equipped vehicle;
  wherein said adaptive speed control system reduces the speed of the equipped vehicle responsive at least in part to a detection of a curve in the road ahead of the equipped vehicle via processing by said image processor of image data captured by said imaging device;
  wherein said adaptive speed control system reduces the speed of the equipped vehicle to a reduced speed for traveling around the detected curve in the road;
  wherein the reduced speed is determined at least in part responsive to (a) processing by said image processor of image data captured by said imaging device and (b) the current geographical location of the equipped vehicle as determined by said global positioning system; and
  wherein said adaptive speed control system increases the speed of the equipped vehicle to above the reduced speed when the equipped vehicle is traveling along a straighter section of road after the curve in the road.

24. The driver assistance system of claim 23, wherein said processing of captured image data by said image processor to determine the reduced speed comprises at least one of (i) recognition of a warning sign and (ii) recognition of a warning sign and character recognition of characters on the recognized warning sign.

25. The driver assistance system of claim 24, wherein said adaptive speed control system reduces the speed of the equipped vehicle to be below or generally at the speed level indicated on the recognized warning sign.

26. The driver assistance system of claim 25, wherein the speed of the equipped vehicle increases to above the speed level indicated on the recognized warning sign when the equipped vehicle is traveling along a straighter section of road after the curve in the road.

27. The driver assistance system of claim 26, wherein said adaptive speed control system comprises a cruise control system and wherein the speed of the equipped vehicle increases to a cruise control speed setting.

28. A driver assistance system for a vehicle, said driver assistance system comprising: an imaging device having a field of view forward of a vehicle equipped with said driver assistance system and in a direction of travel of the equipped vehicle, wherein said imaging device is operable to capture image data;
  an image processor operable to process image data captured by said imaging device;
  a global positioning system operable to determine a geographical location of the equipped vehicle;
  wherein the equipped vehicle comprises an adaptive speed control system for controlling the speed of the equipped vehicle;
  wherein said adaptive speed control system reduces the speed of the equipped vehicle responsive at least in part to a detection of a curve in the road ahead of the equipped vehicle via processing by said image processor of image data captured by said imaging device;
  wherein said adaptive speed control system reduces the speed of the equipped vehicle to a reduced speed for traveling around the detected curve in the road, and wherein the reduced speed is determined at least in part responsive to the current geographical location of the equipped vehicle as determined by said global positioning system;
  wherein said adaptive speed control system comprises a cruise control system and wherein said adaptive speed control system reduces the speed of the equipped vehicle without driver deactivation of said cruise control system; and wherein said adaptive speed control system increases the speed of the equipped vehicle to above the reduced speed when the equipped vehicle is traveling along a straighter section of road after the curve in the road.

29. The driver assistance system of claim 28, wherein the reduced speed is determined at least in part responsive to processing by said image processor of image data captured by said imaging device of a warning sign.

30. The driver assistance system of claim 28, wherein said driver assistance system generates a speed alert.

31. The driver assistance system of claim 30, wherein said speed alert comprises one of (i) a change in intensity of displayed information, (ii) a flashing of displayed information, (iii) a change in color of displayed information, (iv) highlighting of displayed information, (v) an audible alert, (vi) a tactile alert and (vii) a haptic alert.

32. The driver assistance system of claim 31, wherein said driver assistance system generates said speed alert when the speed of the equipped vehicle exceeds a threshold amount.

* * * * *